US012761597B2

(12) United States Patent
Hijikata et al.

(10) Patent No.: US 12,761,597 B2
(45) Date of Patent: Oct. 13, 2026

(54) IMAGE FORMING APPARATUS AND CARTRIDGE

(71) Applicant: CANON KABUSHIKI KAISHA, Tokyo (JP)

(72) Inventors: Shunsuke Hijikata, Kanagawa (JP); Yuuji Obukuro, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/058,180

(22) Filed: Feb. 20, 2025

(65) Prior Publication Data

US 2025/0271806 A1 Aug. 28, 2025

(30) Foreign Application Priority Data

Feb. 27, 2024 (JP) ................................ 2024-027478

(51) Int. Cl.

| | |
|---|---|
| ***G03G 21/18*** | (2006.01) |
| ***G03G 15/00*** | (2006.01) |
| ***G03G 21/00*** | (2006.01) |
| ***G03G 21/12*** | (2006.01) |

(52) U.S. Cl.

CPC ......... *G03G 15/556* (2013.01); *G03G 21/007* (2013.01); *G03G 21/12* (2013.01); *G03G 21/1814* (2013.01); *G03G 21/1821* (2013.01)

(58) Field of Classification Search

CPC ............. G03G 15/556; G03G 15/0848; G03G 15/0849; G03G 15/0853; G03G 15/0856; G03G 15/086; G03G 2215/0888

See application file for complete search history.

(56) References Cited

U.S. PATENT DOCUMENTS

| | | | | |
|---|---|---|---|---|
| 7,499,656 | B2 | 3/2009 | Kimura et al. | |
| 11,815,826 | B2 | 11/2023 | Hijikata et al. | |
| 2016/0077466 | A1* | 3/2016 | Carpenter | G03G 15/086 399/262 |
| 2017/0123348 | A1* | 5/2017 | Carpenter | G03G 15/0875 |
| 2017/0329266 | A1* | 11/2017 | Yago | G03G 15/50 |
| 2025/0271788 | A1* | 8/2025 | Obukuro | G03G 15/0853 |

FOREIGN PATENT DOCUMENTS

| | | | |
|---|---|---|---|
| JP | H01-032049 | Y2 | 10/1989 |
| JP | 2004-286849 | A | 10/2004 |
| JP | 2007-192852 | A | 8/2007 |
| JP | 2010-175768 | A | 8/2010 |

* cited by examiner

*Primary Examiner* — Thomas S Giampaolo, II
(74) *Attorney, Agent, or Firm* — VENABLE LLP

(57) ABSTRACT

An image forming apparatus incluses an apparatus main body, a first cartridge that is detachably attachable to the apparatus main body, and a second cartridge that is detachably attachable to the apparatus main body. The first cartridge includes a storage chamber that stores developer, a rotational shaft provided in the storage chamber so as to be rotatable about a rotational axis line, a flexible member that has one end and an other end in a direction crossing the rotational axis line, the one end being a free end and the other end being a fixed end fixed to the rotational shaft, and a magnetism generating member that is fixed between the fixed end exclusive and the free end inclusive of the flexible member. The second cartridge includes a sensor for detecting magnetism generated by the magnetism generating member.

32 Claims, 16 Drawing Sheets

IMAGE FORMING APPARATUS AND CARTRIDGE

BACKGROUND OF THE INVENTION

Field of the Invention

The present invention relates to a cartridge detachably attachable to an image forming apparatus employing an electrophotographic method.

Description of the Related Art

In an electrophotographic image forming apparatus employing a so-called cartridge system, various configurations are employed as a configuration for detecting a remaining amount of toner as developer and informing a user of timing to exchange the cartridge. While an optical remaining-toner-detection method and an electrostatic remaining-toner-detection method are typical hardware methods for detecting the remaining amount of toner, a remaining-toner-detection method using a magnet is also proposed in Japanese Patent Application Publication No. 2004-286849 and Japanese Examined Utility Model Application Publication No. H01-032049. In the remaining-toner-detection method using a magnet, when the position of the magnet installed inside a container changes in accordance with the amount of toner therein, the distance between the magnet and a sensor changes, and based on a detection voltage changed due to this change in the distance, the amount of toner is estimated. The optical remaining-toner-detection method needs a light guide for input and output, and thus, a space is needed for the light guide. In the electrostatic remaining-toner-detection method, since a high voltage is applied for input and output, an insulation distance needs to be provided to prevent leakage of electricity, and thus, a space is also needed. In contrast, in the remaining-toner-detection method using the magnet as disclosed in Japanese Patent Application Publication No. 2004-286849 and Japanese Examined Utility Model Application Publication No. H01-032049, since the magnet installed inside the container corresponds to the input, there is no need for providing a space for the light guide or the insulation distance.

SUMMARY OF THE INVENTION

In the market of full-color image forming apparatuses in recent years, miniaturization is essential for product competitiveness, and there is a demand for a more compact configuration in the system for detecting the remaining amount of toner.

An object of the present invention is to provide a configuration for detecting the remaining amount of developer, the configuration facilitating apparatus miniaturization.

In order to solve the above-described problem, an image forming apparatus according to the present invention includes:

an apparatus main body;

a first cartridge that is detachably attachable to the apparatus main body, the first cartridge including a storage chamber that stores developer, a rotational shaft that is provided in the storage chamber so as to be rotatable about a rotational axis line, a flexible member that has one end and an other end in a direction crossing the rotational axis line, the one end being a free end and the other end being a fixed end fixed to the rotational shaft, and a magnetism generating member that is fixed between the fixed end exclusive and the free end inclusive of the flexible member; and a second cartridge that is detachably attachable to the apparatus main body, the second cartridge including a sensor for detecting magnetism generated by the magnetism generating member.

In order to solve the above-described problem, a cartridge according to the present invention includes:

a storage chamber that stores developer;

a rotational shaft that is provided in the storage chamber so as to be rotatable about a rotational axis line;

a flexible member that has one end and an other end in a direction crossing the rotational axis line, the one end being a free end and the other end being a fixed end fixed to the rotational shaft; and a magnetism generating member that is fixed between the fixed end exclusive and the free end inclusive of the flexible member, wherein the cartridge is one of a plurality of cartridges detachably attachable to an apparatus main body of an image forming apparatus, and wherein the cartridge includes a sensor for detecting magnetism generated by an other magnetism generating member included in an other cartridge among the plurality of cartridges attached to the apparatus main body.

According to the present invention, there can be provided a configuration for detecting the remaining amount of developer, the configuration facilitating apparatus miniaturization.

Further features of the present invention will become apparent from the following description of exemplary embodiments with reference to the attached drawings.

DESCRIPTION OF THE EMBODIMENTS

Figure 1:
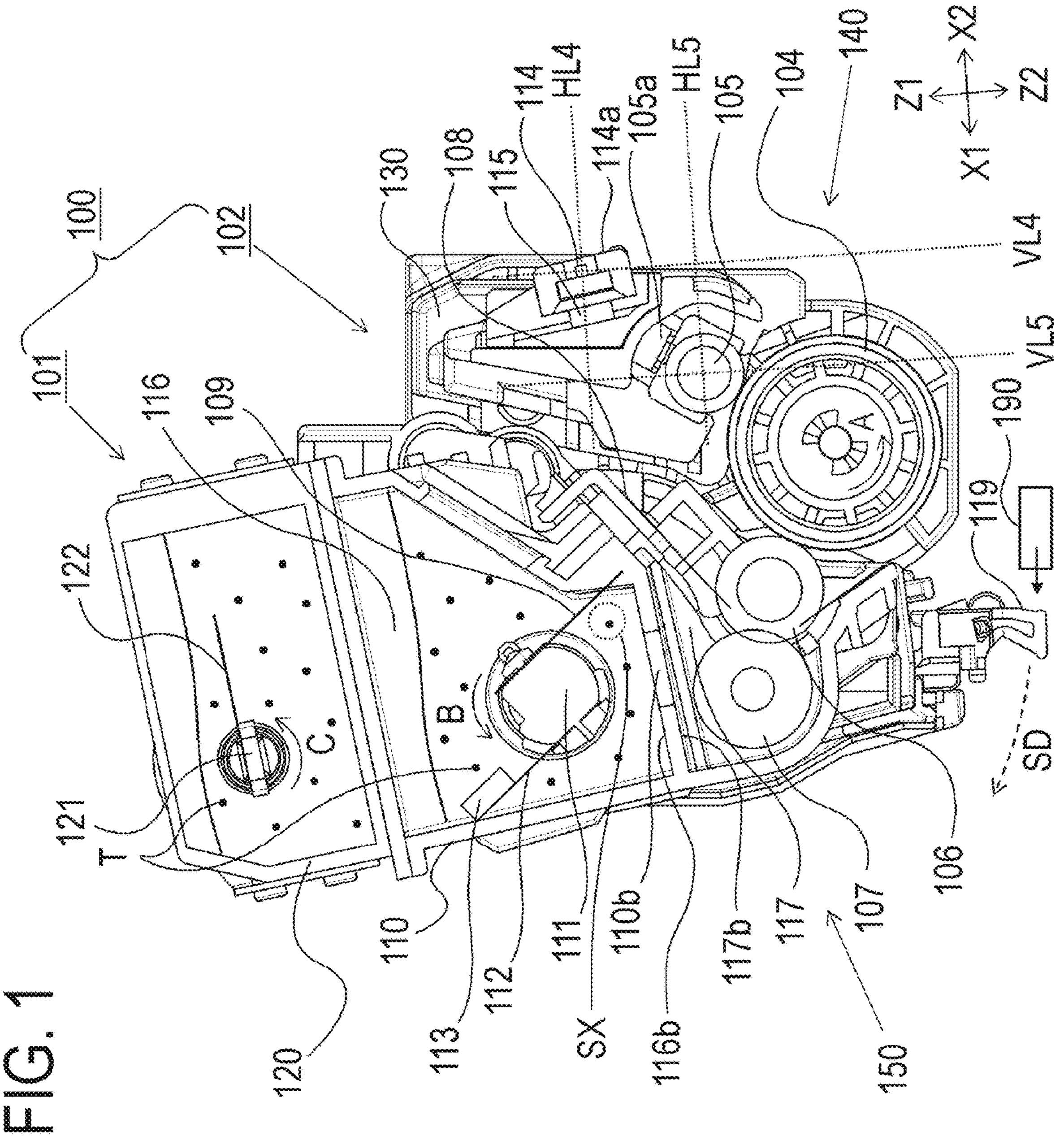
FIG. 1 is a sectional view of a cartridge according to Embodiment 1.

Hereinafter, embodiments of the present invention will be described in detail with reference to the drawings. However, the dimensions, materials, shapes, relative arrangements, and the like of the components described in the embodiments are to be appropriately changed according to a configuration and various conditions of the apparatus to which the invention is applied. That is, the scope of the present invention is not limited to the following embodiments. Further, although a plurality of features is described in the embodiments, all of the plurality of features are not necessarily essential to the invention, and the plurality of features may be arbitrarily combined. In the accompanying drawings, the same or similar components are denoted by the same reference numerals, and redundant description will be omitted.

Embodiment 1

An electrophotographic image forming apparatus (hereinafter, also referred to as an "image forming apparatus") according to Embodiment 1 of the present invention will be described with reference to the drawings. The electrophotographic image forming apparatus forms an image on a sheet-like recording medium such as paper by using an electrophotographic image forming method. Specific examples of the image forming apparatus include a copier, a facsimile machine, a printer (a laser beam printer, an LED printer, etc.), and a multifunction peripheral (a multifunction printer) of the above apparatuses. In the embodiment described below, a laser beam printer will be described as an example as one aspect of the image forming apparatus.

In Embodiment 1, an image forming apparatus to which four toner cartridges and four process cartridges are detachably attachable as cartridges will be described as an example of the image forming apparatus. The number of toner cartridges and the number of process cartridges attached on the image forming apparatus are not limited to these numbers, and are appropriately set as needed.

The cartridges are units which are fixed to or detachably attachable to the above-described image forming apparatus (a detachably attachable unit is also referred to as a cartridge). Examples of the unit configuration include a unit having a process member (for example, a charging member, a developing member, a cleaning member, etc.) acting on a photosensitive member, a unit having toner, etc. That is, the cartridge could have various modes. For example, the cartridge could have a mode in which an all-in-one cartridge in which a drum unit and a developing unit are integrated is replaced, a mode in which a drum unit and a developing unit are separately replaced, etc. Further, a mode in which a process cartridge, other than a toner container containing toner, is fixed to the image forming apparatus, and when the toner is used up, the toner container is replaced by a user, or a mode in which both the toner container and the process cartridge are replaced may also be used.

Schematic Configuration of Image Forming Apparatus

Figure 2:
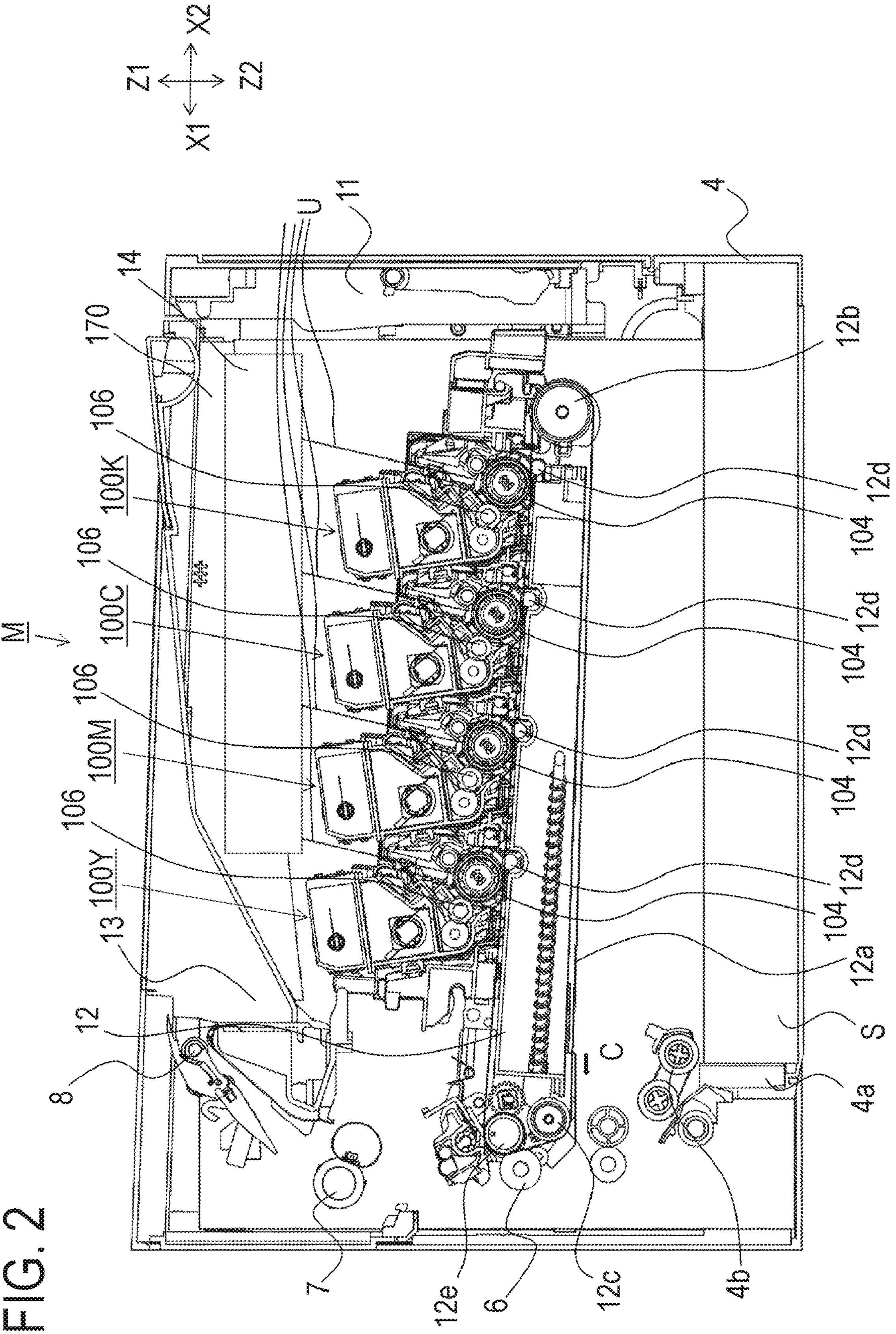
FIG. 2 is a sectional view of an image forming apparatus according to Embodiment 1.

FIG. 1 is a sectional view of a cartridge 100 according to Embodiment 1 of the present invention. FIG. 2 is a sectional view schematically illustrating a configuration of an image forming apparatus M according to Embodiment 1 of the present invention.

The image forming apparatus M is a full-color laser printer using a 4-color electrophotographic process, and forms a color image on a recording medium S. The image forming apparatus M employs a cartridge system, and forms a color image on a recording medium S by detachably attaching the cartridge 100 on an image forming apparatus main body 170.

A side on which a front door 11 is provided is a front side (a front surface) of the image forming apparatus M, and a side opposite to the front side is a rear side (a rear surface) of the image forming apparatus M. Further, the right side and the left side of the image forming apparatus M as viewed from the front side are referred to as a drive side and a non-drive side, respectively.

FIGS. 2 to 5 illustrate states in each of which the image forming apparatus M is placed on a horizontal installation surface, which is a normally assumed installation state of the image forming apparatus M. In each of FIGS. 2 to 5, the horizontal direction extending from the front side to the rear side of the image forming apparatus M is referred to as an X1 direction, and the horizontal direction extending from the rear side to the front side is referred to as an X2 direction. Further, a direction extending from the lower side to the upper side of the image forming apparatus M along the vertical direction (the gravity direction) is referred to as a Z1 direction, and a direction extending from the upper side to the lower side is referred to as a Z2 direction. Further, an upper side and a lower side of the image forming apparatus M as viewed from the front side are referred to as an upper surface and a lower surface, respectively. FIG. 2 is a sectional view of the image forming apparatus M as viewed from the non-drive side, and the near side of the paper corresponds to the non-drive side of the image forming apparatus M, the right side of the paper corresponds to the front side of the image forming apparatus M, and the far side of the paper corresponds to the drive side of the image forming apparatus M. The same applies to FIGS. 3 to 5. Further, in a direction perpendicular to each of the X1-X2 direction and the Z1-Z2 direction, a direction extending from a non-drive side, on which the cartridge 100 does not receive a driving force from the image forming apparatus main body 170, to a drive side, on which the cartridge 100 receives the driving force from the image forming apparatus main body 170, is referred to as a Y1 direction, and a direction opposite to the Y1 direction is referred to as a Y2 direction (see FIGS. 6A and 6B to 8).

In the image forming apparatus main body 170, first to fourth cartridges 100 (100Y, 100M, 100C, and 100K) are arranged in an approximately horizontal direction.

The first to fourth cartridges 100 (100Y, 100M, 100C, and 100K) each have the same electrophotographic process mechanism, and each contain developer (hereinafter, referred to as toner) in different color. The first to fourth cartridges 100 (100Y, 100M, 100C, and 100K) receive a rotational driving force transmitted through a drive output portion (main-body-side drum drive couplings 180 and main-body-side developing drive couplings 185 illustrated in FIGS. 3 to 5) of the image forming apparatus main body 170. The drive output portion will be described in detail below.

Further, the first to fourth cartridges 100 (100Y, 100M, 100C, and 100K) receive bias voltages (charging bias, developing bias, etc.) supplied from the image forming apparatus main body 170 (not illustrated).

The first cartridge 100Y contains yellow (Y) toner and forms a yellow toner image (developer image) on a corresponding photosensitive drum 104. The second cartridge 100M contains magenta (M) toner and forms a magenta toner image on a corresponding photosensitive drum 104. The third cartridge 100C contains cyan (C) toner and forms a cyan toner image on a corresponding photosensitive drum 104. The fourth cartridge 100K contains black (K) toner and forms a black toner image on a corresponding photosensitive drum 104.

A laser scanner unit 14 as an exposure unit is provided above the first to fourth cartridges 100 (100Y, 100M, 100C, and 100K). The laser scanner unit 14 outputs laser light U toward the surface of the photosensitive drum 104 of each of the first to fourth cartridges 100 (100Y, 100M, 100C, and 100K) in accordance with image information supplied by the user.

An intermediate transfer unit 12 as a transfer member is provided below the first to fourth cartridges 100 (100Y, 100M, 100C, and 100K). The intermediate transfer unit 12 includes a driving roller 12*e*, an assist roller 12*c*, and a tension roller 12*b*, and a transfer belt 12*a* having flexibility is stretched around these rollers.

The photosensitive drum 104 of each of the first to fourth process cartridges 100 (100Y, 100M, 100C, and 100K) is positioned above the transfer belt 12*a*, and the outer peripheral surface of each photosensitive drum 104 is in contact with the outer peripheral surface of the transfer belt 12*a* having an annular belt shape. Each contact portion is a primary transfer portion. On the inner side of the transfer belt 12*a*, a primary transfer roller 12*d* is provided to each of the cartridges 100Y, 100M, 100C, and 100K such that each primary transfer roller 12*d* faces its corresponding photosensitive drum 104. The driving roller 12*e* contacts a secondary transfer roller 6 via the transfer belt 12*a*. A contact portion between the transfer belt 12*a* and the secondary transfer roller 6 is a secondary transfer portion.

A paper feed unit 4 is provided below the intermediate transfer unit 12. The paper feed unit 4 includes a paper feed tray 4*a* that stacks and accommodates the recording medium S and a paper feed roller 4*b*. As illustrated in FIG. 2, a fixing device 7 and a paper output device 8 are provided in the upper left portion of the image forming apparatus main body 170. A paper output tray 13 is disposed on the upper surface of the image forming apparatus main body 170.

Image Forming Operation

An operation for forming a full-color image will be described with reference to FIGS. 1 and 2. The photosensitive drum 104 of each of the first to fourth cartridges 100 (100Y, 100M, 100C, and 100K) is rotated at a predetermined speed (in the direction of arrow A in FIG. 1). In addition, the driving roller 12*e* is rotated by a motor (not illustrated) of the image forming apparatus main body 170, and this rotation moves the transfer belt 12*a* in the direction C in FIG. 2.

In each cartridge 100, a charging roller 105 uniformly charges the surface of the photosensitive drum 104 to predetermined polarity and potential. The laser scanner unit 14 scans and exposes the surface of the photosensitive drum 104 with the laser light U in accordance with an image signal of the corresponding color. As a result, an electrostatic latent image corresponding to the image signal of the corresponding color is formed on the surface of each photosensitive drum 104. The formed electrostatic latent image is developed with the toner as the developer borne by a developing roller 106, which is rotated at a predetermined speed.

By the electrophotographic image forming process operation as described above, a yellow toner image corresponding to a yellow element of a full-color image is formed on the photosensitive drum 104 of the first cartridge 100Y. Next, the toner image is primarily transferred onto the transfer belt 12*a*. Similarly, a magenta toner image corresponding to a magenta element of the full-color image is formed on the photosensitive drum 104 of the second cartridge 100M. Next, the magenta toner image is primarily transferred onto the transfer belt 12*a* onto which the yellow toner image has already been transferred in a superimposed manner. Similarly, a cyan toner image corresponding to a cyan element of the full-color image is formed on the photosensitive drum 104 of the third cartridge 100C. Next, the cyan toner image is primarily transferred in a superimposed manner onto the transfer belt 12*a* where the yellow and magenta toner images have already been transferred. Similarly, a black toner image corresponding to a black element of the full-color image is formed on the photosensitive drum 104 of the fourth cartridge 100K. Next, the black toner image is primarily transferred in a superimposed manner onto the transfer belt 12*a* where the yellow, magenta, and cyan toner images have already been transferred. In this way, an unfixed full-color toner image using four colors of yellow, magenta, cyan, and black is formed on the transfer belt 12*a*.

The recording medium S is separated and fed one by one from the paper feed unit 4 at predetermined control timing. The recording medium S is brought into the secondary transfer portion, which is a contact portion between the secondary transfer roller 6 and the transfer belt 12*a*, at predetermined control timing. Thus, during the process of conveying the recording medium S to the secondary transfer portion, the 4-color superimposed toner image on the transfer belt 12*a* is transferred onto the surface of the recording medium S. Next, the toner image transferred onto the recording medium S is fixed by a fixing unit provided in the fixing device 7, and the recording medium S is discharged to the paper output tray 13 by the paper output device 8.

Configuration for Attaching and Detaching Cartridge

Figure 3:
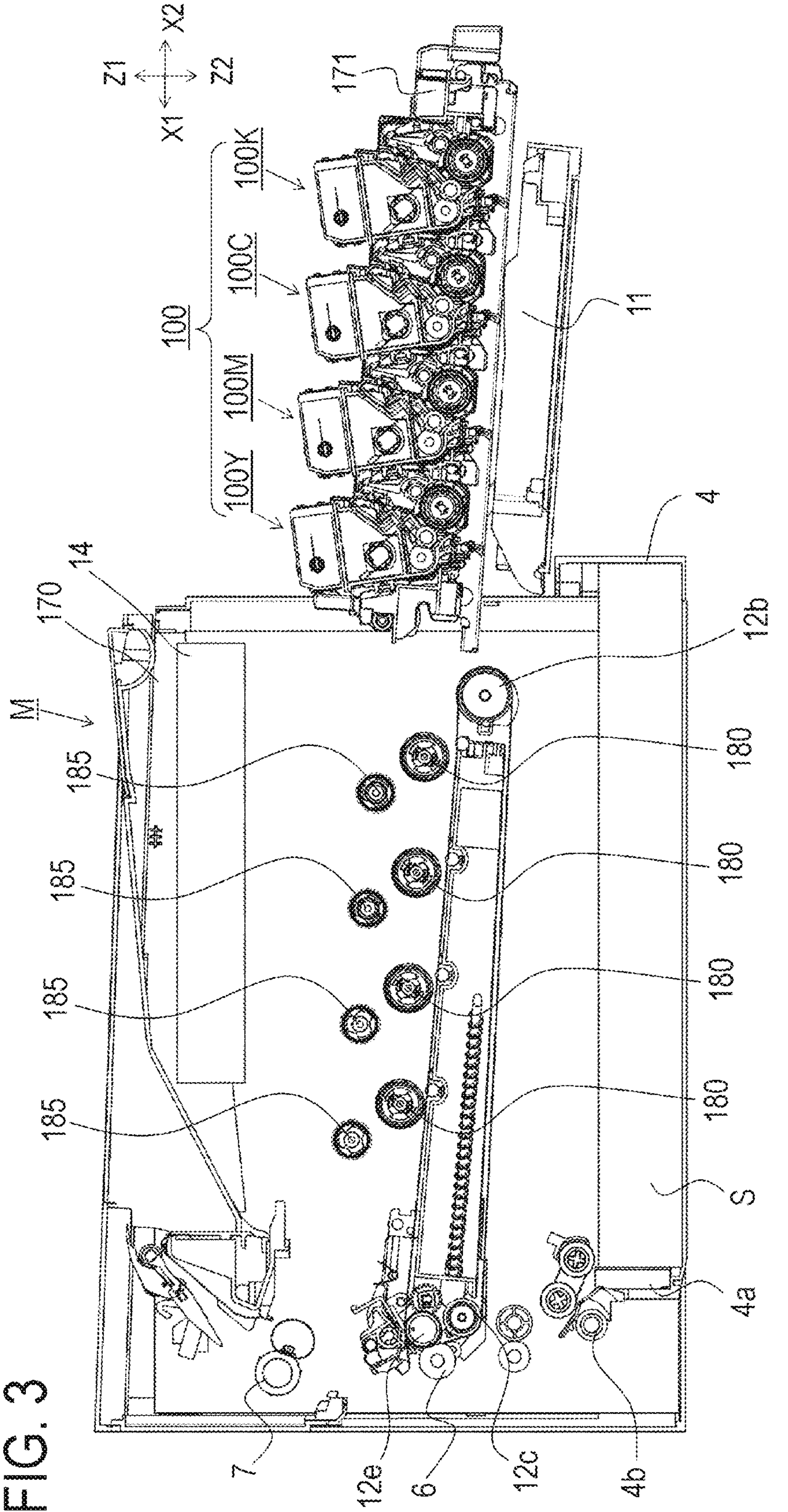
FIG. 3 is a sectional view of the image forming apparatus according to Embodiment 1.
Figure 4:
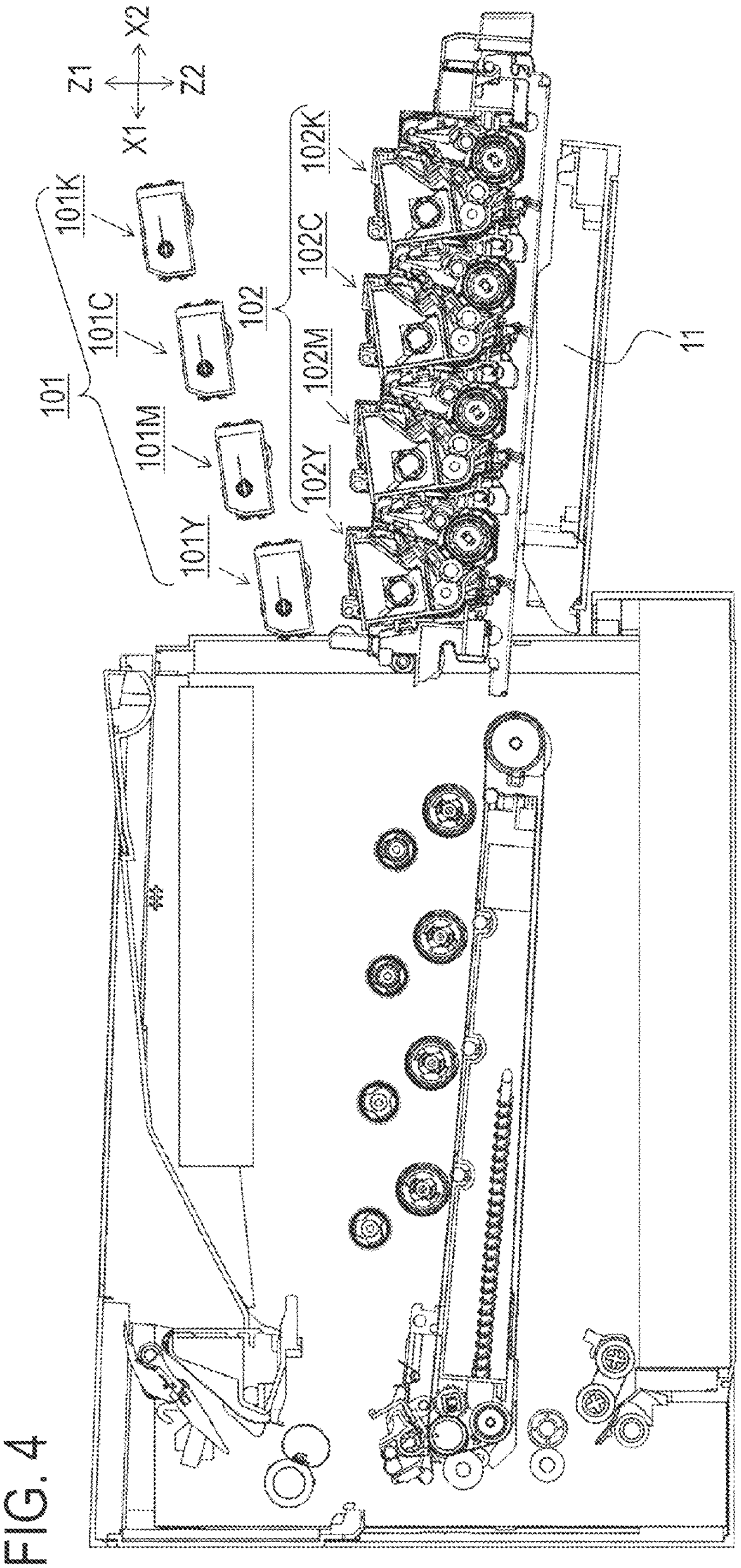
FIG. 4 is a sectional view of the image forming apparatus according to Embodiment 1.
Figure 5:
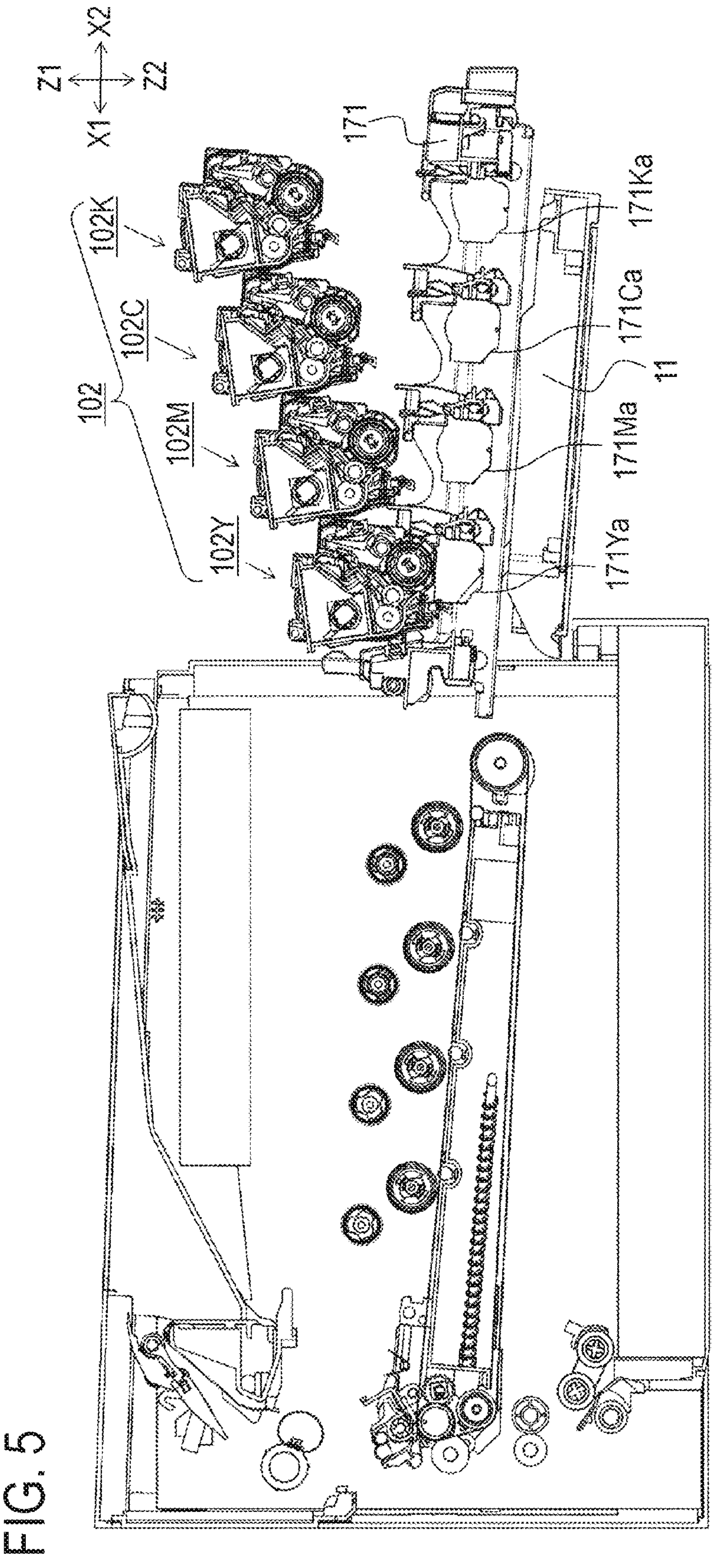
FIG. 5 is a sectional view of the image forming apparatus according to Embodiment 1.

A configuration for attaching and detaching the cartridge 100 will be described with reference to FIGS. 3 to 5. FIG. 3 is a sectional view of the image forming apparatus M in a state in which the front door 11 is opened and a tray 171 has been pulled out to the outside of the image forming apparatus main body 170. FIG. 4 is a sectional view of the image forming apparatus M in a state in which the front door 11 is opened, the tray 171 is positioned outside the image forming apparatus main body 170, and toner cartridges 101 have been detached from process cartridges 102. FIG. 5 is a sectional view of the image forming apparatus M in a state in which the front door 11 is opened, the tray 171 is positioned outside the image forming apparatus main body 170, and the process cartridges 102 have been detached from the tray 171.

As illustrated in FIGS. 3 to 5, the tray 171 is movable in a direction of an arrow X1 (push-in direction) and a direction of an arrow X2 (pull-out direction), which are approximately horizontal directions with respect to the image forming apparatus main body 170. That is, the tray 171 is provided to be capable of being pulled out and pushed in with respect to the image forming apparatus main body 170, and the tray 171 is configured to be movable in an approximately horizontal direction when the image forming apparatus main body 170 is installed on a horizontal surface. In the present embodiment, a state in which the tray 171 is positioned outside the image forming apparatus main body 170 (the states illustrated in FIGS. 3 to 5) is referred to as an outside position. Further, a state in which the tray 171 is positioned inside the image forming apparatus main body 170 in a state in which the front door 11 is opened (the state illustrated in FIG. 2) is referred to as an inside position.

As illustrated in FIG. 4, the toner cartridges 101 are detachable from the process cartridges 102. That is, the cartridges 100 according to the present embodiment are constituted by the process cartridges 102 and the toner cartridges 101. When the toner runs out and printing cannot be performed, the user can replace the toner cartridge 101 with a new one filled with toner. That is, the toner cartridge 101 whose toner has been consumed is removed from the process cartridge 102, a new toner cartridge 101 is attached to the process cartridge 102, the tray 171 is pushed into the image forming apparatus main body 170, and the front door 11 is closed. In this way, the image formation can be performed again.

As illustrated in FIG. 5, the tray 171 includes attaching portions 171Ya, 171Ma, 171Ca and 171Ka from which the respective process cartridges 102 can be removed in the outside position, and the cartridges 100 of respective colors can be attached on the attaching portions 171Ya, 171Ma, 171Ca and 171Ka.

When the photosensitive drum 104, the developing roller 106, or the like deteriorates and the printing quality cannot be maintained, the user can replace the process cartridge 102 with a new one. That is, the process cartridge 102 that needs to be replaced is removed from a corresponding one of the attaching portions 171Ya, 171Ma, 171Ca and 171Ka of the tray 171, and a new process cartridge 102 is attached. Next, the toner cartridge 101 is attached, the tray 171 is pushed into the image forming apparatus main body 170, and the front door 11 is closed. In this way, image formation can be performed again.

In the present embodiment, the intermediate transfer unit 12 can be moved vertically by the front door 11 and a link mechanism (not illustrated). When the front door 11 is opened, the intermediate transfer unit 12 is lowered in the direction of the arrow Z2, and the photosensitive drum 104 and the transfer belt 12*a* are spaced from each other. When the front door 11 is closed, the intermediate transfer unit 12 is moved upward in the direction of the arrow Z1, and the photosensitive drum 104 and the transfer belt 12*a* are brought into contact with each other. In this way, the tray 171 can move the cartridge 100 into and out of the image forming apparatus main body 170 without a contact between the photosensitive drum 104 and the transfer belt 12*a*.

As described above, the tray 171 can collectively move the plurality of cartridges 100 into and out of the image forming apparatus main body 170, and this enables the toner cartridge 101 or the process cartridge 102 to be easily replaced.

Detailed Configuration of Cartridge

A configuration of the cartridge 100 will be described in detail with reference to FIGS. 1, 6A, 6B, 7, and 8. In the present embodiment, the first to fourth cartridges 100 (100Y, 100M, 100C, and 100K) each have the same electrophotographic process mechanism, and contain toner T in different colors and different filling levels.

The cartridge 100 is constituted by a toner cartridge 101 and a process cartridge 102. The toner cartridge 101 is filled with toner T and supplies the toner T to the process cartridge 102. The process cartridge 102 stably forms a latent image on the photosensitive drum 104 using the toner T supplied from the toner cartridge 101, and transfers the latent image to the intermediate transfer unit 12.

The toner cartridge 101 includes a toner container 120, and a toner stirring shaft 121 and toner T are provided in the toner container 120. A toner stirring sheet 122 is attached to the toner stirring shaft 121. The toner cartridge 101 receives a driving force transmitted from the process cartridge 102 (not illustrated) and rotates the toner stirring shaft 121 in the direction C to supply the toner T to the process cartridge 102 through a supply opening (not illustrated).

The process cartridge 102 includes a drum unit 140 and a developing unit 150.

The drum unit 140 includes the photosensitive drum 104 as a rotatable image bearing member formed of a photoconductor, the charging roller 105 as a rotatable charging member, and a container 130 as a drum unit frame for holding the photosensitive drum 104 and the charging roller 105. The charging roller 105 is biased toward the photosensitive drum 104 by a charging spring 105*a*. Further, the surface of the photosensitive drum 104 can be uniformly charged by injecting charges from the image forming apparatus main body 170 to the charging roller 105 through a charging contact point (not illustrated). Further, a drum coupling 160 for transmitting a driving force to the photosensitive drum 104 is provided at one longitudinal end of the photosensitive drum 104. The drum coupling 160 engages with the main-body-side drum drive coupling 180 (illustrated in FIG. 3) as a drum drive output portion of the image forming apparatus main body 170. Thus, the driving force generated by a drive motor (not illustrated) of the image forming apparatus main body 170 is transmitted to the photosensitive drum 104 so that the photosensitive drum 104 is rotated in the direction of the arrow A illustrated in FIG. 1.

The developing unit 150 includes the developing roller 106 as a developer bearing member, a supplying roller 107 as a developer supplying member, a developing blade 108 as a regulating member, and a developer container 110 as a developing unit frame. The developer container 110 includes a toner storage chamber 116 that accommodates and holds the toner T as the developer supplied from the toner cartridge 101, and a developing chamber 117 in which the developing roller 106, the supplying roller 107, and the developing blade 108 are disposed. The toner storage chamber 116 is located above the developing chamber 117 and communicates with the developing chamber 117 through a developing opening 110*b*, which is a communication hole penetrating a bottom surface 116*b* of the storage chamber 116 and a top surface 117*b* of the developing chamber 117.

A stirring shaft 111 as a rotational shaft is rotatably mounted inside the toner storage chamber 116 of the developer container 110, and a stirring sheet 109, which is a sheet member having flexibility (a flexible member), is attached to the stirring shaft 111. The developing coupling 161 illustrated in FIG. 6A engages with the main-body-side developing drive coupling 185 (illustrated in FIG. 3) as a drum drive output portion of the image forming apparatus main body 170. Thus, the driving force generated by the drive motor (not illustrated) of the image forming apparatus main body 170 can be transmitted to the stirring shaft 111. The toner T in the toner storage chamber 116 is supplied to the supplying roller 107 through the developing opening 110*b* formed in the developer container 110 by the rotation of the stirring shaft 111 in the direction of the arrow B illustrated in FIG. 1. The toner T supplied to the supplying roller 107 is supplied to the developing roller 106. The developing blade 108 regulates the toner T on the developing roller 106 to a uniform thickness. In this way, the toner can be stably supplied to the photosensitive drum 104 with which the developing roller 106 is in contact.

The drum unit 140 and the developing unit 150 are connected to each other so as to be relatively rotatable about a rotational axis SX parallel to a direction (Y1-Y2 direction) in which the rotational axes of the photosensitive drum 104 and the developing roller 106 extend. The drum unit 140 and the developing unit 150 are configured to take a contact position (an image forming position) in which the photosensitive drum 104 and the developing roller 106 are brought into contact with each other by receiving a biasing force of a spring (not illustrated). When a force receiving portion 119 provided at a lower end of the developing unit 150 is biased by a force applying portion 190 provided in the image forming apparatus main body 170, the developing unit 150 moves relative to the drum unit 140 in a rotational direction SD indicated by a dashed arrow. As a result, the relative position between the drum unit 140 and the developing unit 150 transitions from the above-described contact position (the image forming position) to a separate position (a non-image forming position) in which the photosensitive drum 104 and the developing roller 106 are separated from each other. The relative position between the drum unit 140 and the developing unit 150 may be controlled such that the drum unit 140 and the developing unit 150 take the separate position while the image forming operation is not performed, that is, for example, when the cartridge 100 is attached or detached, and take the contact position when the image forming operation is performed. In the present embodiment, the drum unit 140 is fixed to the image forming apparatus main body 170 (the tray 171), and the developing unit 150 is rotated relative to the drum unit 140 so that the relative position between the drum unit 140 and the developing unit 150 is changed. However, the present invention is not limited to the above-described configuration.

In the present embodiment, the individual cartridge is constituted by the toner cartridge 101 and the process cartridge 102. However, the present invention is not limited to the above-described configuration. For example, the toner cartridge 101 and the process cartridge 102 may be integrated into an all-in-one cartridge. Alternatively, the developing unit in which the developing roller and the supplying roller are integrally held in the toner cartridge holding the toner and the drum unit in which the photosensitive drum and the charging roller are held may be configured to be separately provided. Further, the drum unit may have a drum cleaning mechanism.

Method for Detecting Remaining Amount of Toner

A method for detecting the remaining amount of toner, which is a feature of the present embodiment, will be described in detail with reference to FIG. 1, and FIGS. 6A and 6B to FIGS. 12A and 12B. When the user performs printing, the toner is consumed, and the amount of toner in each cartridge 100 decreases. It is desirable to notify the user before the toner is completely used up and an image defect, such as toner not being printed on the printed matter, occurs. Thus, a method for detecting the remaining amount of toner to grasp the amount of toner held in the cartridge 100 will be described.

As illustrated in FIG. 1, the stirring shaft 111 is rotatably mounted inside the toner storage chamber 116 of the developer container 110 of the process cartridge 102. A flexible sheet 112 is fixed to the stirring shaft 111. The flexible sheet 112 is a sheet member having flexibility, and is fixed to the stirring shaft 111 such that one end of the flexible sheet 112 in a direction crossing the rotational axis line of the stirring shaft 111 is configured to be a free end and an other end is configured to be a fixed end. A magnet 113 as a magnetism generating member is attached at a position away from the other end (the fixed end) fixed to the stirring shaft 111, more specifically, at a position between the other end exclusive fixed to the stirring shaft 111 and the one end (the free end) inclusive on the opposite side. While the magnet is used as the magnetism generating member in the present embodiment, another material that generates a magnetic force may also be used.

Figure 6B:
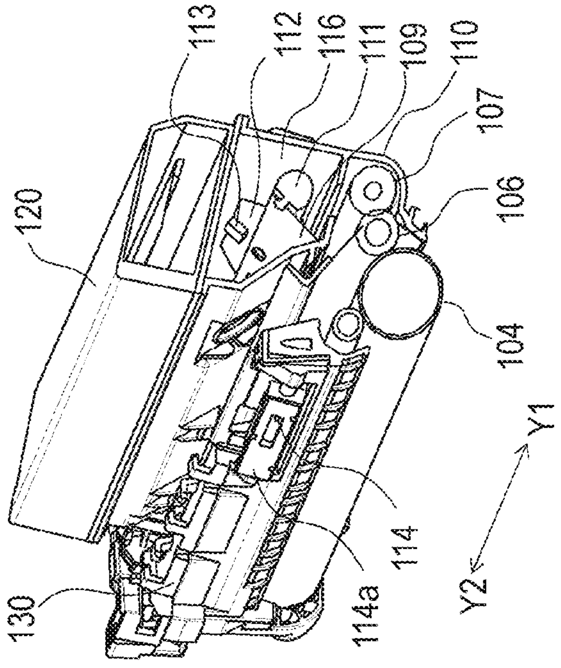
FIGS. 6A and 6B are a perspective view and a sectional perspective view of the cartridge according to Embodiment 1.
Figure 6A:
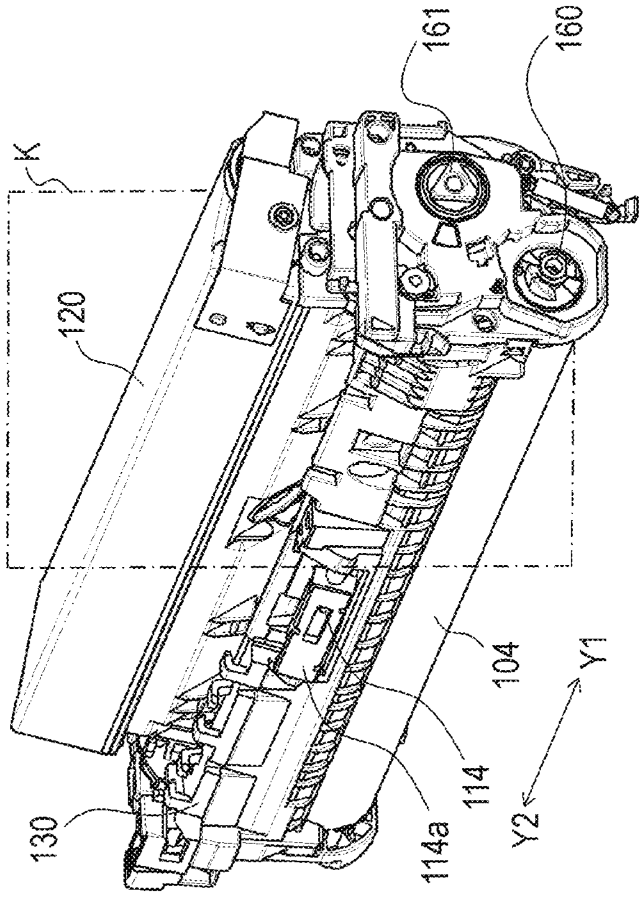

FIG. 6A is a perspective view of the cartridge 100, and FIG. 6B is a sectional perspective view taken along a cross section K in FIG. 6A. As illustrated in FIG. 6B, in the present embodiment, the flexible sheet 112 is provided at a central portion in the longitudinal direction (the Y1-Y2 direction along the rotational axis line) of the stirring shaft 111. The stirring sheet 109 for stirring and conveying the toner in the toner storage chamber 116 is provided with a width extending over approximately the entire longitudinal area of the toner storage chamber 116. It is preferable that the flexible sheet 112 be provided with a minimum width in the longitudinal direction of the toner storage chamber 116 so as not to affect the accuracy of detection of the remaining amount of toner (so as not to greatly change the storage state of toner due to the movement of the flexible sheet 112). The shape and material of the magnet 113 and the shape, material, and thickness of the flexible sheet 112 can be appropriately selected in accordance with their characteristics.

A magnetic sensor 114 for detecting magnetism is attached to the container 130 of the process cartridge 102. The magnetic sensor 114 is not for detecting the magnetism of the magnet 113 provided in the process cartridge 102 to which this magnetic sensor 114 is attached, but for detecting the magnetism of a magnet 113 provided in an other adjacent process cartridge 102 (see FIG. 9).

Figure 7:
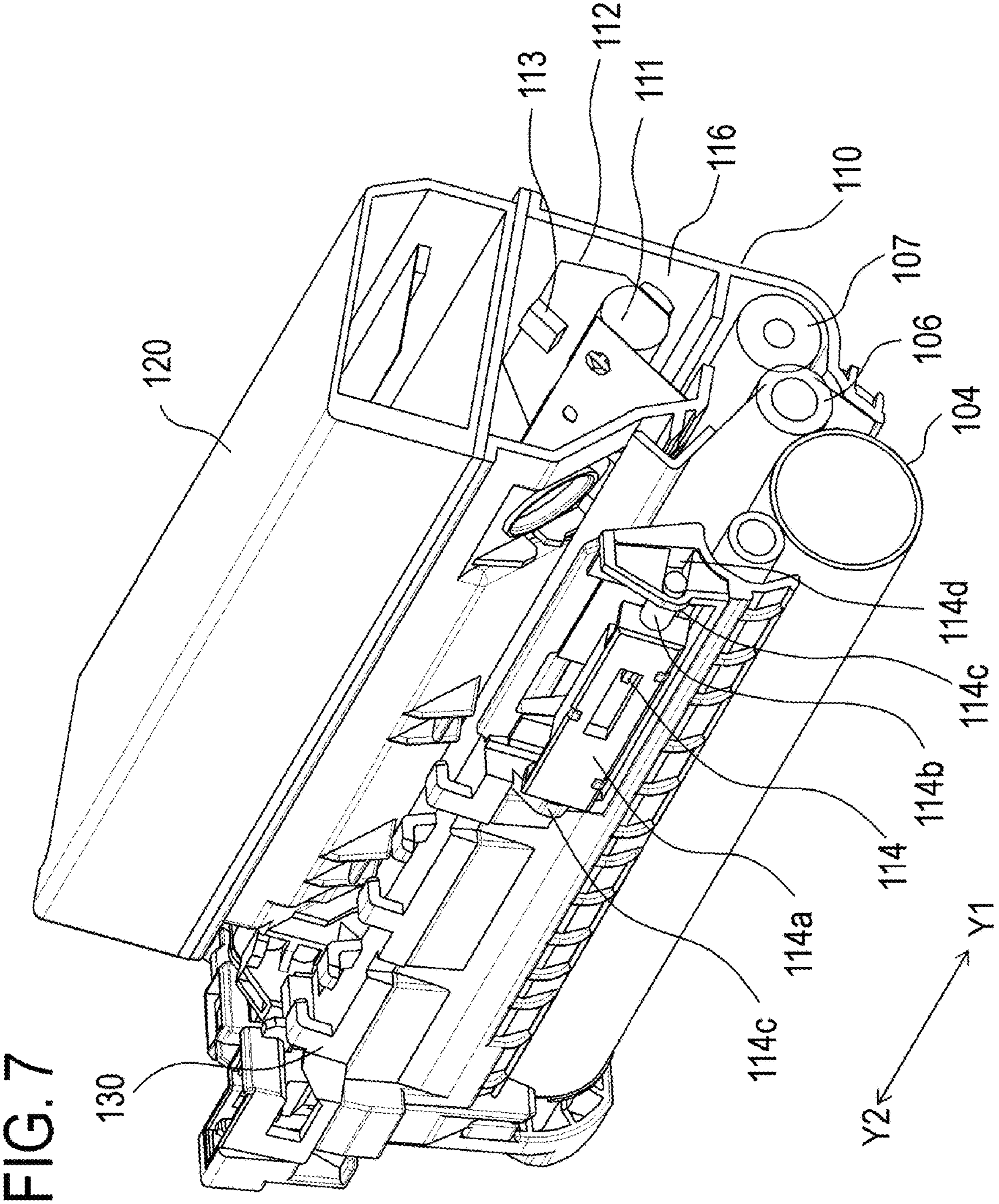
FIG. 7 is a sectional perspective view of the cartridge according to Embodiment 1.
Figure 8:
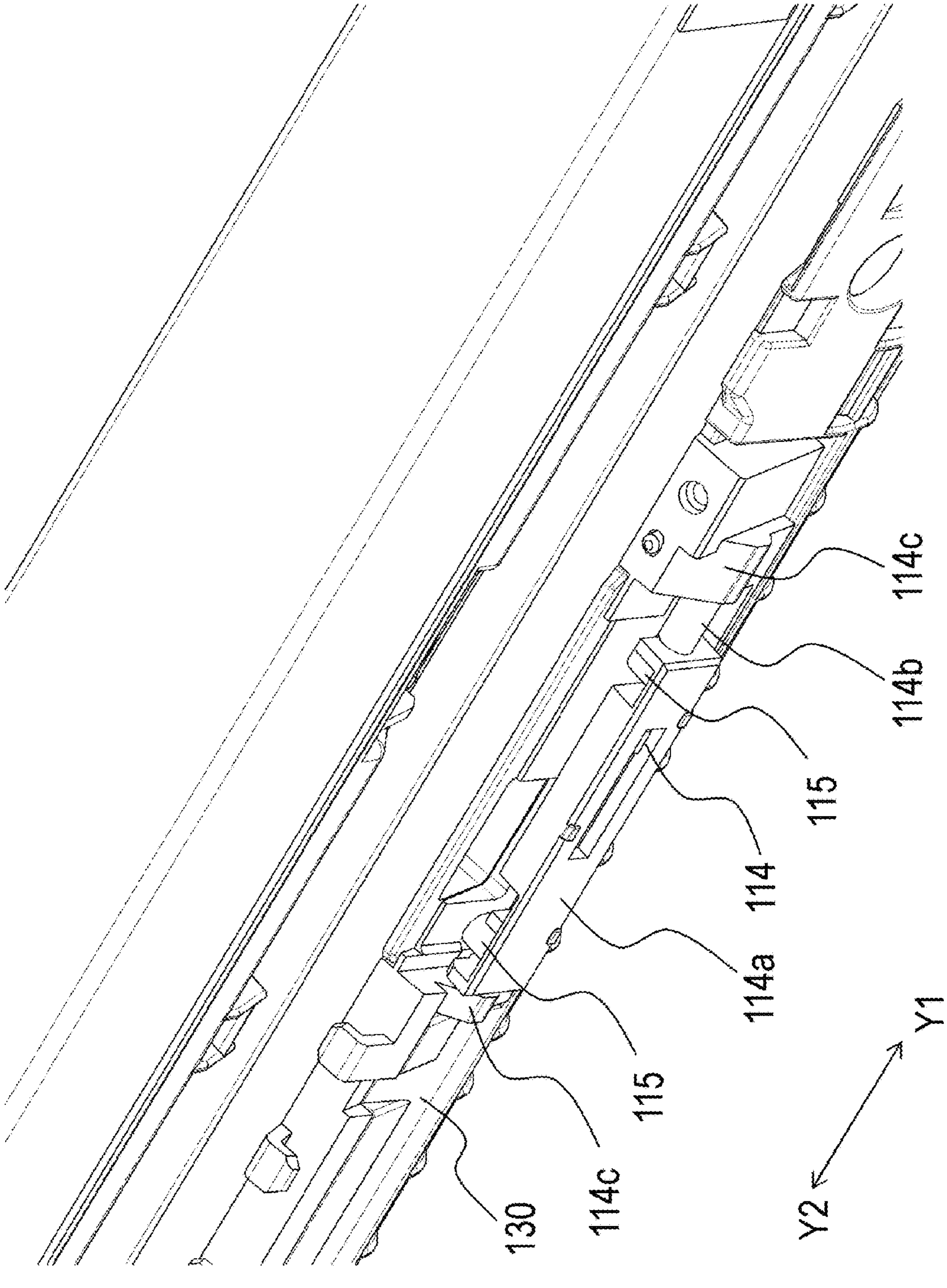
FIG. 8 is a perspective view of the periphery of a sensor of the cartridge according to Embodiment 1.

FIG. 7 is a sectional perspective view of the cartridge 100, taken along a position different from the cross section K in FIG. 6B, and is a diagram illustrating a configuration of the periphery of the magnetic sensor 114. FIG. 8 is an enlarged perspective view of the cartridge 100 for describing the configuration of the periphery of the magnetic sensor 114.

As illustrated in FIGS. 7 and 8, the magnetic sensor 114 is held by a holder 114*a*. The holder 114*a* includes guided portions 114*b* that are shaft portions protruding from both ends of the holder 114*a* in a direction (Y1-Y2 direction) along the direction in which the rotational axis line of the stirring shaft 111 extends. The container 130 includes holder guides 114*c* as guiding portions and a sensor spring 115 as biasing members. The holder guides 114*c* and the sensor spring 115 constitute a bias support portion that supports the holder 114*a* such that a biasing force is applied to the holder 114*a*, the biasing force pressing the holder 114*a* against the outer wall surface of an other developer container 110 of an other adjacent cartridge 100.

Each of the holder guides 114*c* has a guide groove 114*d* that is hollowed in a direction (Y1-Y2 direction) along the direction in which the rotational axis line of the stirring shaft 111 extends and is extended in a direction in which the holder 114*a* is brought into contact with/separated from an other developer container 110 of an other adjacent cartridge 100. The guide grooves 114*d* are disposed on both sides of the holder 114*a* in the Y1-Y2 direction, facing each other, and a pair of the guided portions 114*b* provided on both sides of the holder 114*a* in the Y1-Y2 direction are inserted into the respective guide grooves 114*d*. The holder 114*a* is configured to be movable in a direction toward and away from the other developer container 110 (contact/separating direction) by the guided portions 114*b* being guided by the guide grooves 114*d*.

The sensor spring 115 is attached between the rear surface of the holder 114*a* and the container 130. The sensor spring 115 applies a biasing force to the rear surface of the holder 114*a*, which is a side opposite to the side on which the magnetic sensor 114 is exposed to the outside, and press the holder 114*a* in a direction toward the other developer container 110. By receiving such a biasing force, the holder 114*a* is brought into contact with the other developer container 110, and the magnetic sensor 114 held by the holder 114*a* is brought into a state of facing the outer surface of the other developer container 110.

The contact state between the holder 114*a* and an other developer container 110 is automatically formed when each cartridge 100 is attached on the tray 171, as illustrated in FIGS. 4 and 5. That is, the other cartridge 100 is configured to be attachable to the tray 171 while the outer wall surface of the other developer container 110 pushes the holder 114*a* away in the separating direction against the biasing force of the sensor spring 115. As a result, by the attaching of the cartridges 100, a state in which the holder 114*a* is in contact with the developer container 110 of the adjacent cartridge 100 can be formed.

Figure 9:
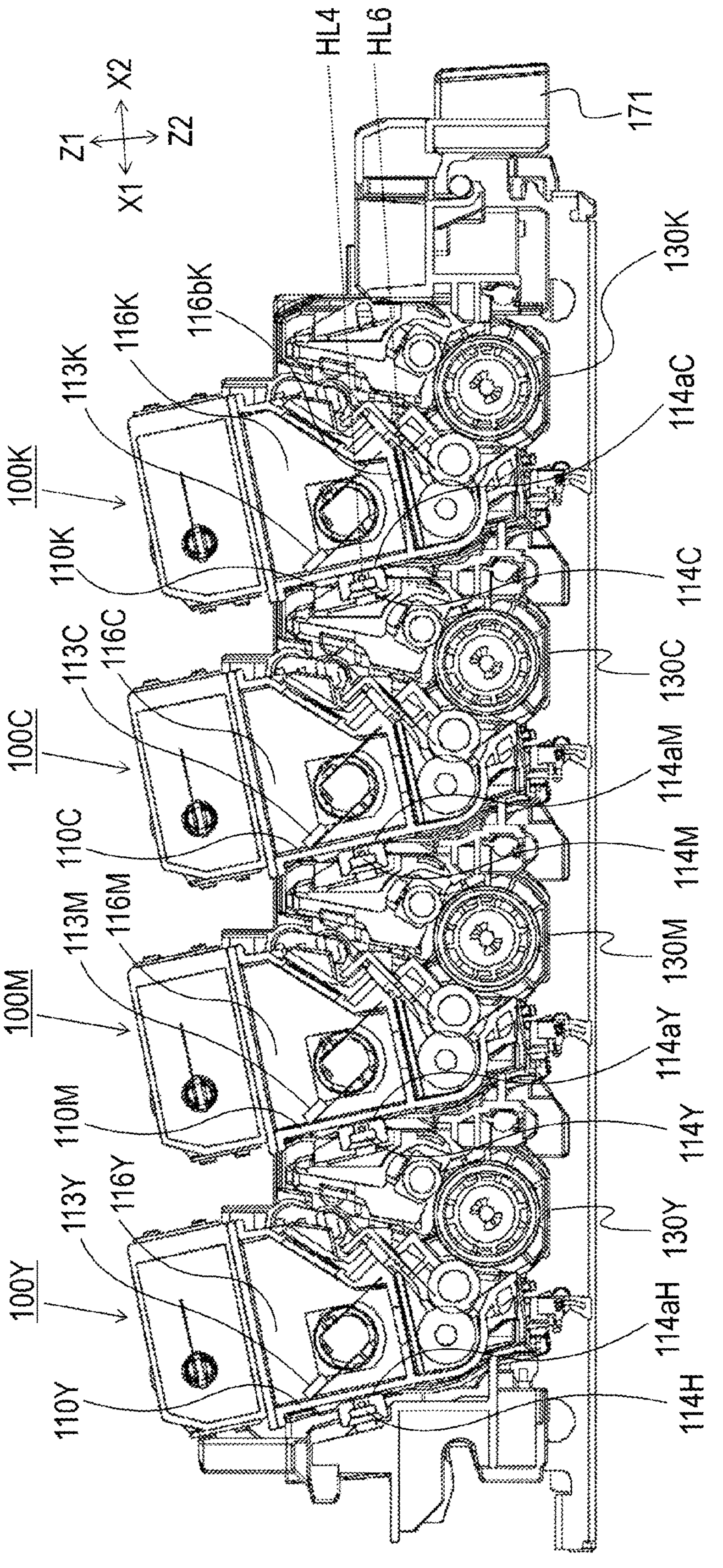
FIG. 9 is a sectional view of a tray unit according to Embodiment 1.

A configuration in which the individual magnetic sensor 114 detects the magnetism of the magnet 113 will be described with reference to FIGS. 1 and 9. FIG. 9 is a schematic sectional view (a sectional view taken along the X1-X2 and Z1-Z2 directions each of which is perpendicular to the rotational axis line of the photosensitive drum 104, for example) illustrating the tray 171 and the first to fourth cartridges 100Y, 100M, 100C, and 100K attached on the tray 171.

In the present embodiment, among the first to fourth cartridges 100Y, 100M, 100C, and 100K, the fourth cartridge 100K includes a magnet 113K as a magnetism generating member, and does not include a magnetic sensor. The first to third cartridges 100Y, 100M, and 100C are cartridges each of which includes the magnetic sensor 114 for detecting the remaining amount of toner in an other adjacent cartridge 100. The plurality of cartridges 100 is arranged to be aligned along the X1-X2 direction as a first direction. In the direction (X1-X2 direction) in which the plurality of cartridges 100 is aligned, each magnetic sensor 114 is disposed in the cartridge frame of the cartridge 100 that includes this magnetic sensor 114 such that the magnetic sensor 114 is positioned on a side close to an other cartridge frame of an other adjacent cartridge 100 so as to face the other cartridge frame. That is, in the container 130 of the drum unit 140 and the developer container 110 of the developing unit 150 constituting the cartridge frame, the magnetic sensor 114 is provided in the container 130, rather than the developer container 110, and faces the outer surface of the container 130 of an other cartridge 100. The magnetism of a magnet 113Y of the first cartridge 100Y is detected by a magnetic sensor 114H provided on the tray 171.

As illustrated in FIG. 9, the magnetism of the magnet 113K of the fourth cartridge 100K containing black (K) toner is detected by a magnetic sensor 114C held by the third cartridge 100C. In this case, a holder 114*a*C holding the magnetic sensor 114C is biased by the sensor spring 115 to be brought into contact with the outer wall surface of the developer container 110.

In the relationship of the third cartridge 100C and the fourth cartridge 100K to the present invention, the third cartridge 100C corresponds to a second cartridge of the present invention, and the fourth cartridge 100K corresponds to a first cartridge of the present invention. The cartridge frame (a developer container 110C, a container 130C) of the third cartridge 100C corresponds to a second frame of the present invention, and the cartridge frame (a developer container 110K, a container 130K) of the fourth cartridge 100K corresponds to a first frame of the present invention. In addition, in the developer container 110C, the toner storage chamber 116C corresponds to a second storage chamber of the present invention, the stirring shaft 111 corresponds to a second rotational shaft of the present invention, the flexible sheet 112 corresponds to a second flexible member of the present invention, and the magnet 113C corresponds to a second magnetism generating member of the present invention. In the developer container 110K, the toner chamber 116K corresponds to a first storage chamber of the present invention, the stirring shaft 111 corresponds to a first rotational shaft of the present invention, the flexible sheet 112 corresponds to a first flexible member of the present invention, and the magnet 113K corresponds to a first magnetism generating member of the present invention. Further, in the third cartridge 100C, the photosensitive drum 104 corresponds to a second photosensitive drum, the drum unit 140 corresponds to a second drum unit, the developing roller 106 corresponds to a second developing roller, and the developing unit 150 corresponds to a second developing unit. In the fourth cartridge 100K, the photosensitive drum 104 corresponds to a first photosensitive drum, the drum unit 140 corresponds to a first drum unit, the developing roller 106 corresponds to a first developing roller, and the developing unit 150 corresponds to a first developing unit.

Similarly, as illustrated in FIG. 9, the magnetism of the magnet 113C of the third cartridge 100C is detected by a magnetic sensor 114M held by the second cartridge 100M. At this time, a holder 114*a*M holding the magnetic sensor 114M is biased by the sensor spring 115 to be brought into contact with the outer wall surface of the developer container 110C.

In the relationship of the second cartridge 100M and the third cartridge 100C to the present invention, the second cartridge 100M corresponds to the second cartridge of the present invention, and the third cartridge 100C corresponds to the first cartridge of the present invention. Therefore, the relationship of the respective parts of the second cartridge 100M and the third cartridge 100C to the present invention is the same as the relationship of those of the third cartridge 100C and the fourth cartridge 100K to the present invention described above.

In addition, in the relationship of the second to fourth cartridges 100M, 100C, and 100K to the present invention, when the third cartridge 100C corresponds to the second cartridge of the present invention, the second cartridge 100M corresponds to a third cartridge of the present invention. In this case, the magnetic sensor 114C corresponds to a second sensor of the present invention, and the magnetic sensor 114M corresponds to a third sensor of the present invention.

Similarly, as illustrated in FIG. 9, the magnetism of a magnet 113M of the second cartridge 100M is detected by a magnetic sensor 114Y held by the first cartridge 100Y. In this case, a holder 114*a*Y holding the magnetic sensor 114Y is biased by the sensor spring 115 to be brought into contact with the outer wall surface of a developer container 110M.

In the relationship of the first cartridge 100Y and the second cartridge 100M to the present invention, the first cartridge 100Y corresponds to the second cartridge of the present invention, and the second cartridge 100M corresponds to the first cartridge of the present invention. Therefore, the relationship of the respective parts of the first cartridge 100Y and the second cartridge 100M to the present invention is the same as the relationship of those of the third cartridge 100C and the fourth cartridge 100K to the present invention as described above.

In addition, in the relationship of the first to third cartridges 100Y, 100M, and 100C to the present invention, when the second cartridge 100M corresponds to the second cartridge of the present invention, the first cartridge 100Y corresponds to the third cartridge of the present invention. In this case, the magnetic sensor 114M corresponds to the second sensor of the present invention, and the magnetic sensor 114Y corresponds to the third sensor of the present invention.

Similarly, as illustrated in FIG. 9, the magnetism of the magnet 113Y of the first cartridge 100Y is detected by a magnetic sensor 114H held by the tray 171. In this case, a holder 114*a*H holding the magnetic sensor 114H is biased by the sensor spring 115 to be brought into contact with the outer wall surface of a developer container 110Y.

In the relationship of the first cartridge 100Y, the second cartridge 100M, and the tray 171 to the present invention, the magnetic sensor 114Y corresponds to the second sensor of the present invention, and the magnetic sensor 114H corresponds to a fourth sensor of the present invention.

A method for estimating the amount of toner will be described with reference to FIGS. 10A to 10C to FIGS. 11A to 11C. While the description will be made for one cartridge 100 here, the amount of toner is detected by the same method in any of the first to fourth cartridges.

Figure 10C:
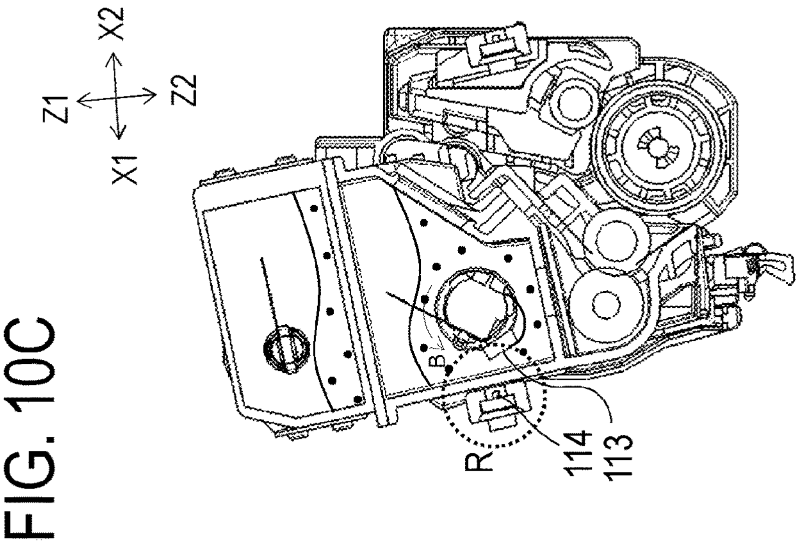
FIGS. 10A to 10C are explanatory diagrams illustrating a method for detecting the remaining amount of toner according to Embodiment 1.
Figure 10B:
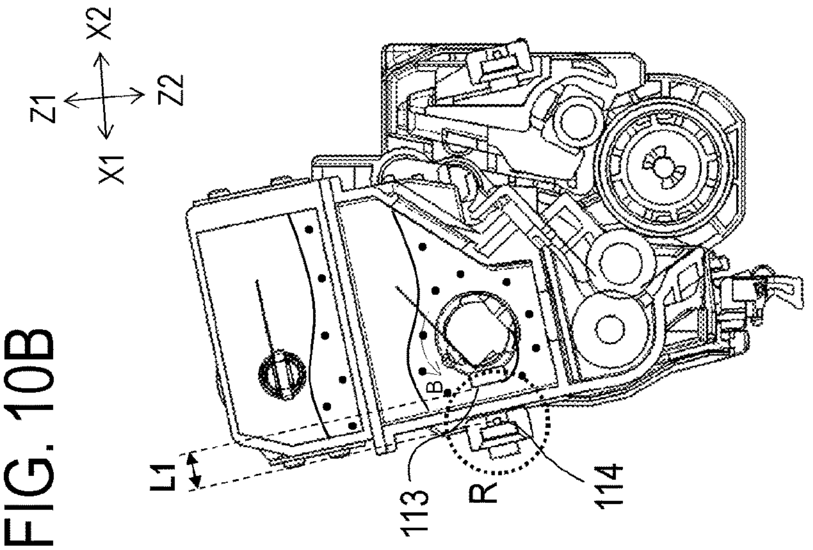
Figure 10A:
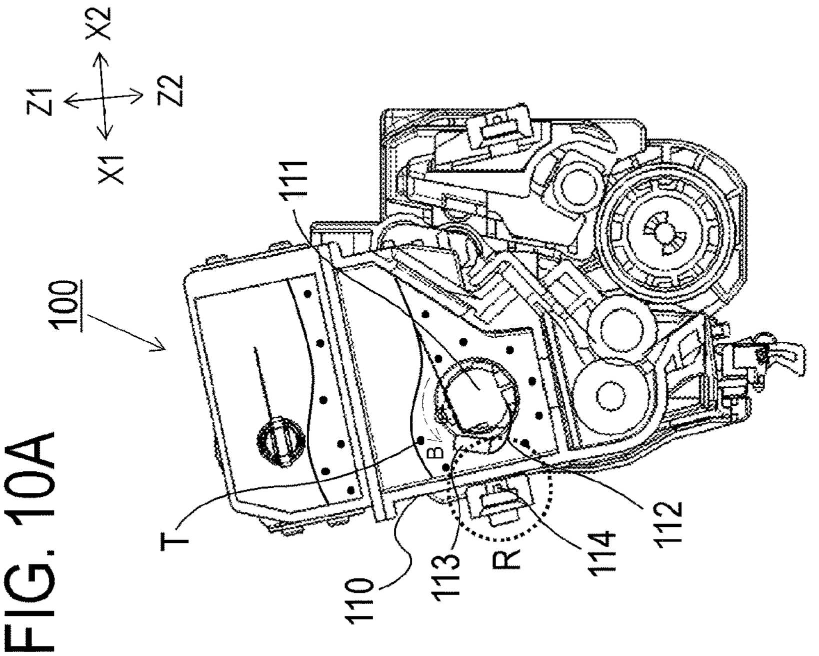

FIGS. 10A to 10C are schematic sectional views of the cartridge 100 in a state in which there is nearly a full supply of toner T contained in the developer container 110. FIGS. 10A to 10C illustrate states in each of which the magnet 113 moved by the rotation of the stirring shaft 111 is passing through a detection range R of the magnetic sensor 114 included in the adjacent cartridge 100. FIG. 10B is a diagram illustrating a state in which the magnet 113 has reached the position closest to the magnetic sensor 114 disposed in the adjacent cartridge. FIG. 10A illustrates a state of the rotation of the stirring shaft 111 slightly earlier than the state illustrated in FIG. 10B. FIG. 10C illustrates a state of the rotation of the stirring shaft 111 slightly later than the state illustrated in FIG. 10B.

Figure 11A:
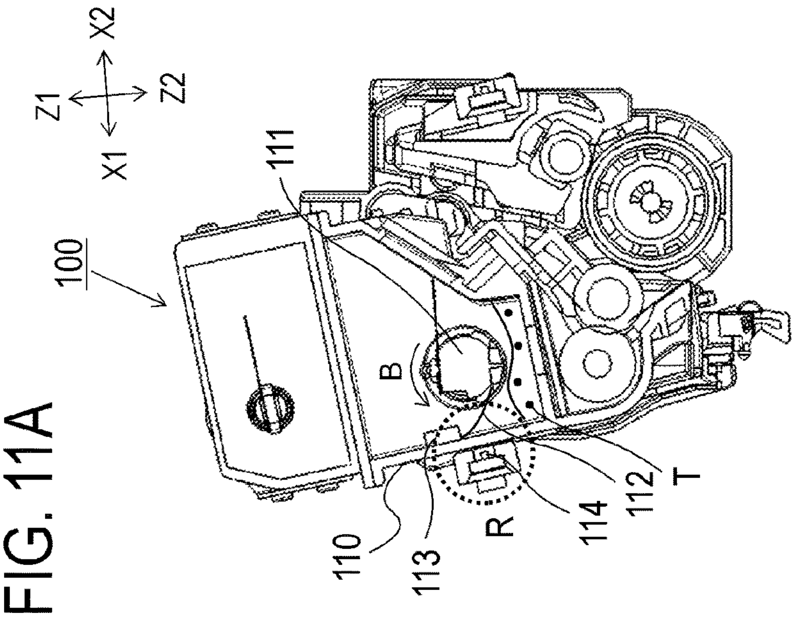
FIGS. 11A to 11C are explanatory diagrams illustrating the method for detecting the remaining amount of toner according to Embodiment 1.
Figure 11B:
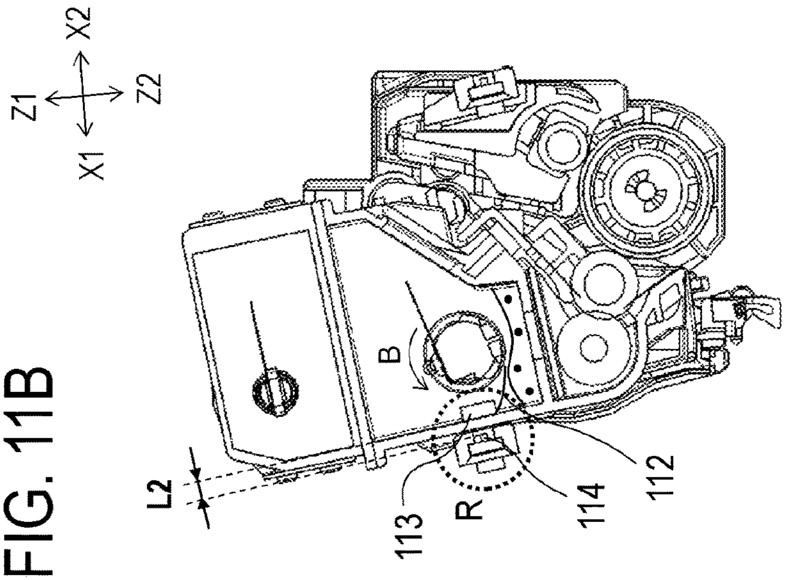
Figure 11C:
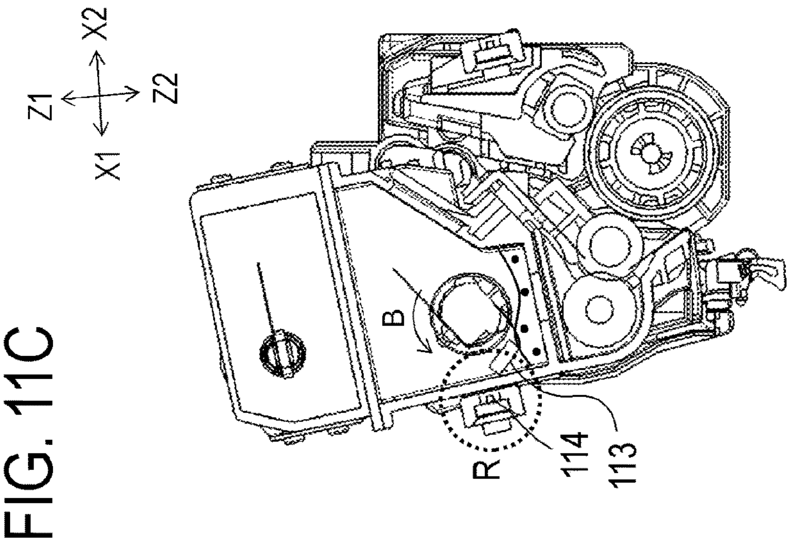

FIGS. 11A to 11C are schematic sectional views of the cartridge 100 in a state in which there is scarcely any toner T in the developer container 110. FIGS. 11A to 11C illustrate states in each of which the magnet 113 moved by the rotation of the stirring shaft 111 is passing through the detection range R of the magnetic sensor 114 included in the adjacent cartridge 100. FIG. 11B is a diagram illustrating a state in which the magnet 113 has reached the position closest to the magnetic sensor 114 disposed in the adjacent cartridge. FIG. 11A illustrates a state of the rotation of the stirring shaft 111 slightly earlier than the state illustrated in FIG. 11B. FIG. 11C illustrates a state of the rotation of the stirring shaft 111 slightly later than the state illustrated in FIG. 11B.

The flexible sheet 112 is formed of a sheet member as thin as possible (a PET or PPS sheet having a thickness of 50 μm in the present embodiment) so as not to affect the accuracy of detecting the remaining amount of toner (so as not to greatly change the state of the stored toner by the movement of the flexible sheet 112). Therefore, as illustrated in FIGS. 10A to 10C, in the developer container 110 to which the toner T is abundantly supplied from the toner cartridge 101, the toner T acts as resistance, and the flexible sheet 112 rotates while being bent when the stirring shaft 111 rotates in the direction B. Therefore, the magnet 113 is separated from the magnetic sensor 114 by a distance of L1 at the position closest to the magnetic sensor 114 (FIG. 10B).

On the other hand, as illustrated in FIGS. 11A to 11C, when there is scarcely any toner T in the toner cartridge 101, the toner T is not supplied to the developer container 110. Since the toner T, which has been serving as resistance, is no longer present in the developer container 110 in which the toner T has been consumed, the amount of bending of the flexible sheet 112 is reduced so that the magnet 113 can be brought closer to the magnetic sensor 114 as illustrated in FIG. 11B. When this distance between the magnet 113 and the magnetic sensor 114 is represented by L2, L1>L2 is obtained. That is, the behavior of the magnet 113 changes in accordance with the amount of toner T in the developer container 110, and consequently, the duration (hereinafter, referred to as detection time) for which the magnetic sensor 114 detects the magnetism generated by the magnet 113 changes.

Figure 12A:
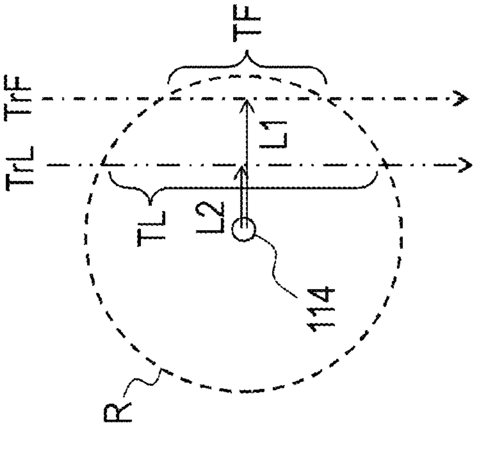
FIGS. 12A and 12B are explanatory diagrams illustrating a relationship between detection time and the remaining amount of toner according to Embodiment 1.

FIG. 12A is a schematic diagram for describing that the time taken by the magnetic sensor 114 to detect the magnetism of the magnet 113 changes in accordance with the change in the amount of toner. An arrow TrF of a dashed line with one dot illustrated in FIG. 12A indicates a movement trajectory of the magnet 113 passing through the detection range R of the magnetic sensor 114 while there is nearly a full supply of toner T in the developer container 110. An arrow TrL of a dashed line with two dots illustrated in FIG. 12A indicates a movement trajectory of the magnet 113 passing through the detection range R of the magnetic sensor 114 when the toner T in the developer container 110 has been consumed.

As illustrated in FIG. 12A, the movement trajectory TrF of the magnet 113 when there is full toner passes through a position away from the magnetic sensor 114 due to the resistance of the toner. Thus, the magnet 113 stays in the detection range R of the magnetic sensor 114 for a short time. On the other hand, the movement trajectory TrL of the magnet 113 when the toner has been consumed passes through a position closer to the magnetic sensor 114 due to a smaller resistance of the toner. Thus, the magnet 113 stays in the detection range R of the magnetic sensor 114 for a longer time. That is, the smaller the amount of toner is, the closer the magnet 113 can be to the magnetic sensor 114. Consequently, the detection time increases as the amount of toner decreases.

Figure 12B:
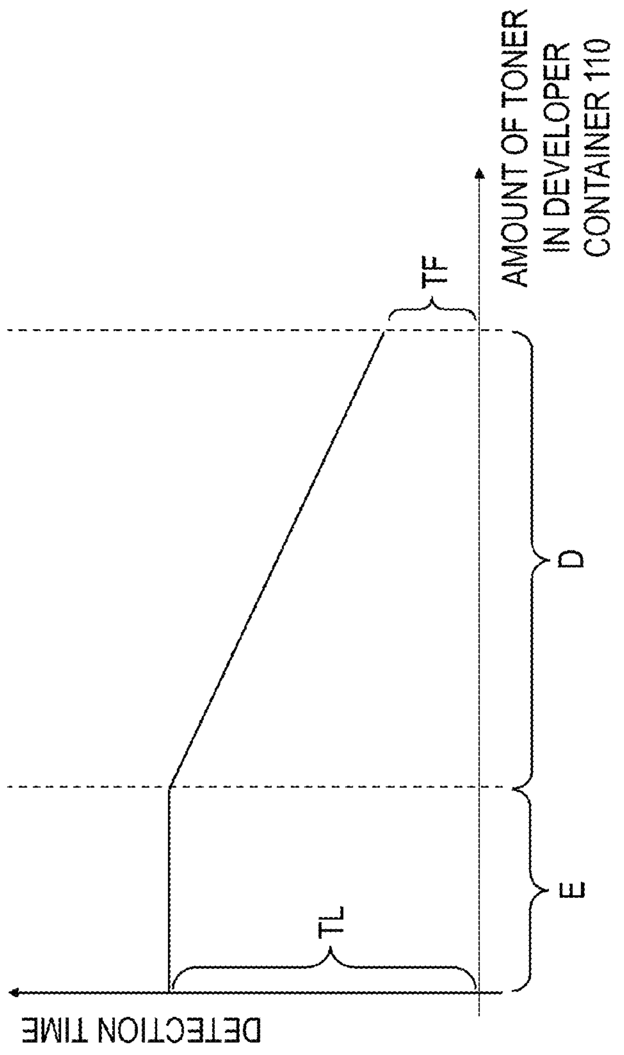

FIG. 12B specifically illustrates the relationship between the amount of toner in the developer container 110 and the detection time of the magnetic sensor 114. The horizontal axis of the graph in FIG. 12B represents the amount of toner in the developer container 110, and the vertical axis represents the detection time. Since the toner T in the developer container 110 is consumed and decreases, the amount of toner actually transitions from the right to the left side of the paper in FIG. 12B.

As illustrated in FIG. 12B, the amount of toner and the detection time are in a proportional relationship until the amount of toner decreases to some extent, and the amount of toner can be estimated (portion D). In a state in which the amount of toner is further reduced from the state of FIGS. 11A to 11C (portion E of FIG. 12B), the remaining amount of toner is extremely small, and the flexible sheet 112 is not bent by the toner T. Therefore, the detection of the remaining amount by the detection configuration of the present embodiment is difficult. Thus, when the remaining amount of toner becomes extremely small, the remaining amount of toner can be estimated by, for example, switching to a remaining amount detection using a method in which the remaining amount of toner is estimated from an image pattern. Although this method has a potential for error accumulation, the impact of such errors would be extremely small since, in the present embodiment, it is only necessary to estimate a small amount of toner, which is nearly used up. Thus, the amount of toner can be detected with high accuracy until the toner filled in the developer container 110 is consumed and used up.

Further, according to the configuration for detecting the remaining amount of toner in the present embodiment, further space saving and miniaturization of the full-color image forming apparatus can be achieved. In a typical tandem-type image forming apparatus, a predetermined space is provided between adjacent cartridges. However, as illustrated in FIGS. 2, 9, etc., the present embodiment utilizes this space for disposing the magnetic sensor 114.

As illustrated in FIG. 1, in the horizontal direction (the X1-X2 direction) approximately along the direction in which the cartridges 100 are aligned, the magnetic sensor 114 is positioned closer to the developer container 110 of the adjacent cartridge 100 than the charging roller 105. Specifically, in the horizontal direction, the position of the magnetic sensor 114 (a virtual perpendicular line VL4 passing through the magnetic sensor 114) is located downstream of the position of the charging roller 105 (a virtual perpendicular line VL5 passing through the charging roller 105) in the X2 direction. In addition, in the vertical direction (the Z1-Z2 direction), the magnetic sensor 114 is positioned higher than the charging roller 105. Specifically, in the vertical direction, the position of the magnetic sensor 114 (a virtual line HL4 passing through the magnetic sensor 114) is higher than the position of the charging roller 105 (a virtual line HL5 passing through the charging roller 105). The position of the magnetic sensor 114 corresponds to a dead space formed at the periphery of the charging roller 105 between the adjacent cartridges 100. According to the present embodiment, the magnetic sensor 114 can be disposed while filling the dead space, and thus, space saving and miniaturization can be achieved.

The above-described magnetic sensor 114 needs to be disposed such that the magnetic sensor 114 can detect the magnetism of the magnet 113 of the adjacent cartridge 100 without detecting the magnetism of the magnet 113 of the cartridge 100 in which the magnetic sensor 114 is disposed. As illustrated in FIG. 9, the magnetic sensor 114 is provided so as to be aligned with the toner storage chamber 116 in a direction (the first direction) in which the cartridges 100 are aligned, the direction being approximately along the horizontal direction (the X1-X2 direction). That is, when viewed in the horizontal direction (the X1-X2 direction) approximately along the direction in which the cartridges 100 are aligned, the magnetic sensor 114 is provided at a height overlapping the toner storage chamber 116. In addition, in the vertical direction (the Z1-Z2 direction), the position of the magnetic sensor 114 (the virtual line HL4 passing through the magnetic sensor 114) is higher than the position of the bottom surface 116*b* of the toner storage chamber 116 (the virtual line HL6 passing through the bottom surface 116*b*). Further, the magnetic sensor 114 is provided at a height overlapping the stirring shaft 111 when viewed in the horizontal direction (the X1-X2 direction). According to the above-described configuration, even if an inexpensive sensor having a relatively narrow detection range R is used as the magnetic sensor 114, it is possible to provide the arrangement that can increase the magnetism detection time during the rotation of the stirring shaft 111 as the amount of toner contained in the toner storage chamber 116 decreases. As a result, cost reduction can be achieved.

By detecting the amount of toner in the developer container with the above-described configuration, the remaining amount of toner can be stably detected even with a compact color low-end product. In the present embodiment, the process cartridge in the cartridge system has been described as an example. However, the process cartridge may have a configuration in which the developing device is fixed to the image forming apparatus.

Embodiment 2

Embodiment 2 of the present invention will be described. In Embodiment 2, configurations and operations different from those in Embodiment 1 will be described. Members having similar configurations and functions as those in Embodiment 1 are denoted by the same reference numerals, and redundant description will be omitted. In Embodiment 2, matters not particularly described are the same as those in Embodiment 1.

In the present embodiment, an example in which the configuration for detecting the remaining amount of toner according to the present invention is applied to the estimation of the amount of used waste toner will be described.

Detailed Configuration of Cartridge

A configuration of a cartridge 200 will be described in detail with reference to FIGS. 13 and 14. In the present embodiment, first to fourth process cartridges 200 (200Y, 200M, 200C, and 200K) each have the same electrophotographic process mechanism, and contain toner T in different colors and different filling levels.

The integrated cartridge 200 includes a rotatable photosensitive drum 104 formed of a photoconductor, a container 230 for holding the photosensitive drum 104, and a rotatable charging roller 105. The charging roller 105 is biased toward the photosensitive drum 104 by a charging spring 105*a*. Further, the surface of the photosensitive drum 104 can be uniformly charged by injecting charges from an image forming apparatus main body 170 to the charging roller 105 through a charging contact point (not illustrated). A method for driving the photosensitive drum 104 is the same as that in Embodiment 1, and thus, the description thereof will be omitted.

The cartridge 200 includes a developer container 210 that holds toner T. A stirring shaft 111 is provided inside the developer container 210, and a stirring sheet 109 is attached to the stirring shaft 111. A method for stably supplying the toner T in the developer container 210 to the drum is the same as that in Embodiment 1, and thus, the description thereof will be omitted.

The cartridge 200 includes a cleaning member 201 fixed to the container 230. The cleaning member 201 is a member for removing residual toner T1 remaining on the surface of the photosensitive drum 104 after the primary transfer. The residual toner T1 removed from the photosensitive drum 104 by the cleaning member 201 can be collected and held in a waste toner portion 240 as a storage chamber formed in the container 230.

The cartridge of the present embodiment is an integrated all-in-one cartridge. However, the configuration of the cartridge is not limited thereto. For example, the cartridge may be configured to include a toner cartridge that contains toner and a process cartridge that includes a developing roller, a supplying roller, a drum, a charging roller, and a cleaning member. Alternatively, a developing unit that includes a developing roller, a supplying roller, and toner and a drum unit that includes a photosensitive drum, a charging roller, and a cleaning member may be provided separately.

Method for Detecting Remaining Amount of Toner

A method for detecting the remaining amount of toner, which is a feature of the present embodiment, will be described in detail with reference to FIGS. 13 to 16. When the user performs printing, the toner is consumed, and the residual toner T1 remaining on the drum surface is collected into the waste toner portion 240 of the container 230 by the cleaning member 201. The capacity of the waste toner portion 240 is limited, and it is necessary to notify the user before the waste toner portion 240 becomes full. In view of this, the present embodiment will describe a configuration in which the user can be notified before the waste toner portion 240 becomes full by detecting the amount of waste toner.

Figure 13:
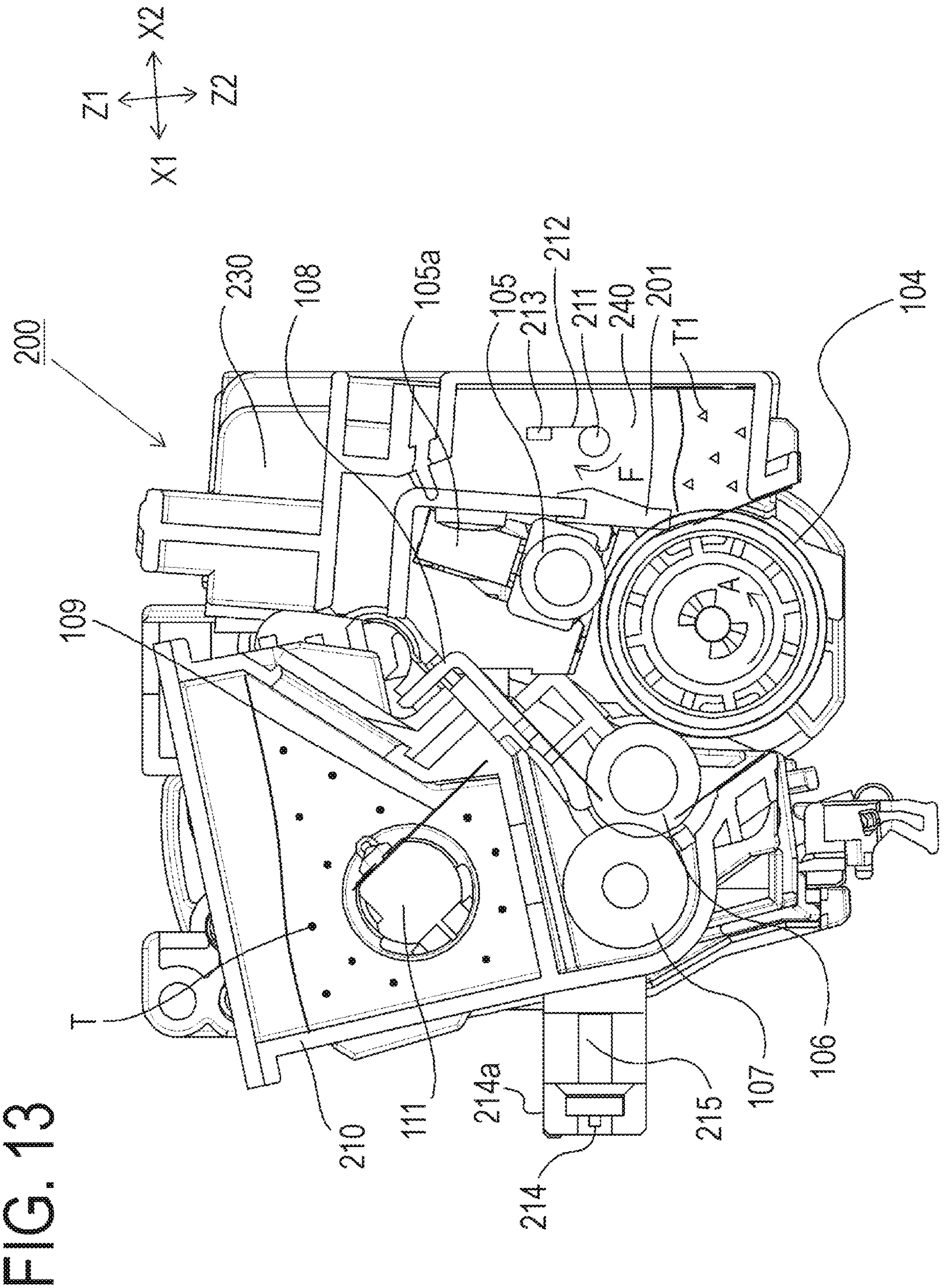
FIG. 13 is a sectional view of a cartridge according to Embodiment 2.
Figure 14:
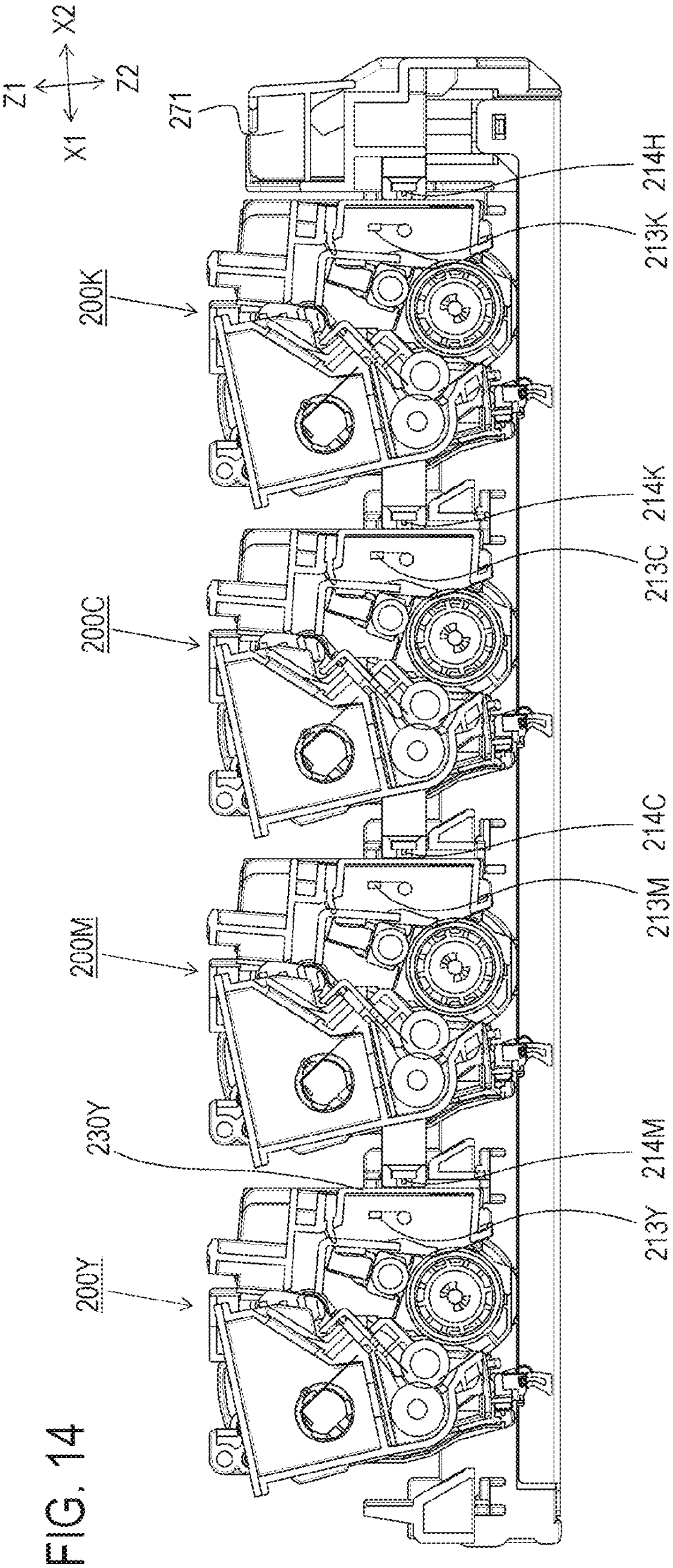
FIG. 14 is a sectional view of a tray unit according to Embodiment 2.

As illustrated in FIG. 13, a stirring shaft 211 is rotatably attached to the waste toner portion (waste toner storage chamber) 240 of the container 230. The stirring shaft 211 can be rotated in an F direction by a drive input (not illustrated). A flexible sheet 212 is fixed to the stirring shaft 211. The flexible sheet 212 is a sheet member (a flexible member) having flexibility, and is fixed to the stirring shaft 211 such that one end in a direction crossing the rotational axis line of the stirring shaft 211 is configured to be a free end, and an other end is configured to be a fixed end. A magnet 213 as a magnetism generating member is attached to the flexible sheet 212 at a position away from the other end (the fixed end) fixed to the stirring shaft 211, more specifically, at a position between the other end exclusive fixed to the stirring shaft 211 and the one end (the free end) inclusive on the opposite side. While the magnet is used as the magnetism generating member in the present embodiment, another material that generates a magnetic force may also be used.

A magnetic sensor 214 for detecting magnetism is attached to the developer container 210. The magnetic sensor 214 is not for detecting the magnetism of the magnet 213 provided in the cartridge 200 to which this magnetic sensor 214 is attached, but for detecting the magnetism of a magnet 213 provided in an other adjacent cartridge 200 (see FIG. 14). As in Embodiment 1, in the present embodiment, too, the shape and material of the magnet 213 and the shape, material, and thickness of the flexible sheet 212 can be appropriately selected in accordance with their characteristics.

As illustrated in FIG. 13, the magnetic sensor 214 is held by a holder 214*a*. The container 230 is provided with a bias support portion that supports the holder 214*a* such that a biasing force is applied to the holder 214*a* to press the holder 214*a* against the outer wall surface of an other container 230 of an other adjacent cartridge 200. The specific configuration of the bias support portion including a sensor spring 215 that applies the biasing force is the same as that in Embodiment 1, and thus, the description thereof will be omitted.

A configuration in which the individual magnetic sensor 214 detects the magnetism of the magnet 213 will be described with reference to FIGS. 13 and 14. FIG. 14 is a diagram illustrating a state in which the cartridges 200 of the respective colors are attached on the tray 271. The magnetic sensor 214 is disposed on one side of the developer container 210 in a direction (the X1-X2 direction) in which the plurality of cartridges 200 is aligned, and the magnet 213 is provided in the waste toner unit 240 of the container 230 of each cartridge 200.

The magnetism of a magnet 213Y of the first cartridge 200Y containing yellow (Y) toner is detected by a magnetic sensor 214M held by the second cartridge 200M. In this case, the magnetic sensor 214M is biased toward the container 230 of the first cartridge 200Y by the sensor spring 215 illustrated in FIG. 13.

Similarly, the magnetism of a magnet 213M of the second cartridge 200M is detected by a magnetic sensor 214C held by the third cartridge 200C. The magnetic sensor 214C is biased toward the container 230 of the second cartridge 200M by the sensor spring 215, as is the case with the magnetic sensor 214M.

The magnetism of a magnet 213C of the third cartridge 200C is detected by a magnetic sensor 214K held by the fourth cartridge 200K. The magnetic sensor 214K is biased toward the container 230 of the third cartridge 200C by the sensor spring 215, as is the case with the magnetic sensors 214M and 214C.

The magnetism of a magnet 213K of the fourth cartridge 200K is detected by a magnetic sensor 214H held by the tray 271. The magnetic sensor 214H is biased toward the container 230 of the fourth cartridge 200K by the sensor spring 215, as is the case with the magnetic sensors 214M, 214C, and 214K.

Figure 15B:
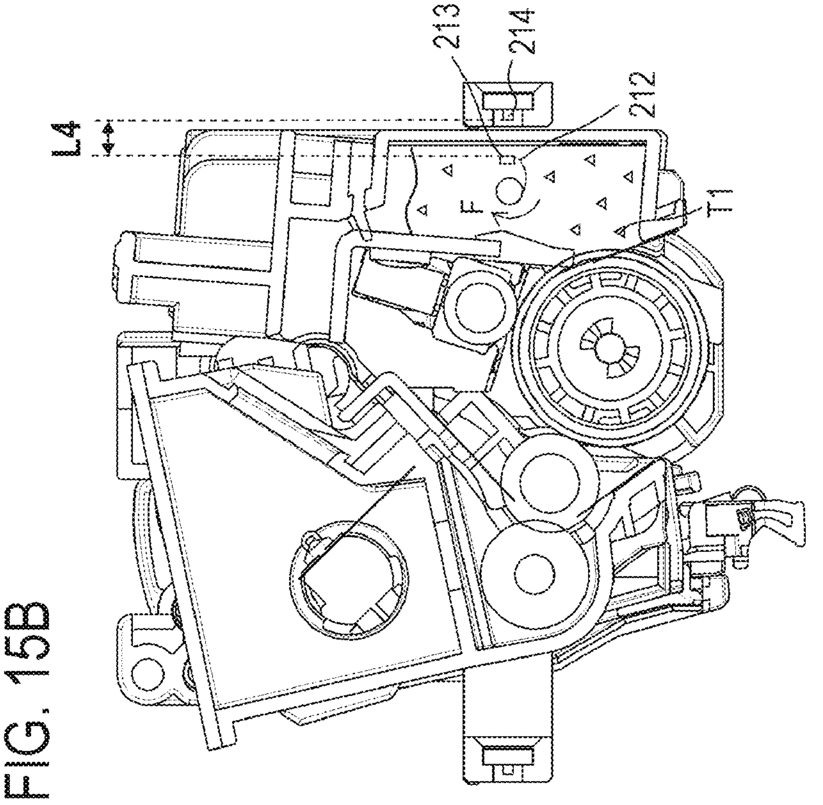
FIGS. 15A and 15B are explanatory diagrams illustrating a method for detecting the remaining amount of toner according to Embodiment 2.

A method for estimating the amount of toner will be described with reference to FIGS. 15A, 15B, and 16. While the description will be made for one cartridge 200 here, the amount of waste toner in any of the first to fourth cartridges is detected by the same method.

Figure 15A:
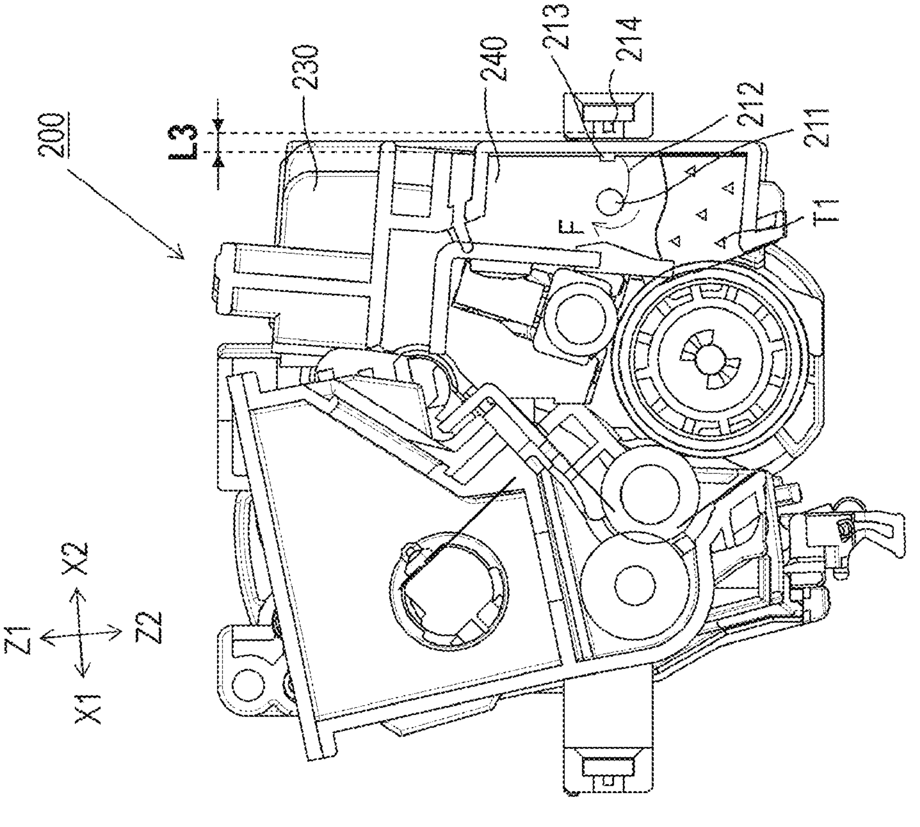

FIG. 15A is a sectional view illustrating a state in which there is scarcely any waste toner T1 in the waste toner portion 240 of the container 230. In this state, the stirring shaft 211 rotates in the F direction, and the magnet 213 has reached the position closest to the magnetic sensor 214 disposed in the adjacent cartridge. FIG. 15B is a sectional view illustrating a state in which there is nearly full of waste toner T1 in the waste toner portion 240 of the container 230. In this state, the stirring shaft 211 rotates in the F direction, and the magnets 213 has reached the position closest to the magnetic sensor 214 disposed in the adjacent cartridge.

As illustrated in FIG. 15A, the cartridge 200 that has been used only for a short time has a small amount of waste toner T1 stored in the waste toner portion 240 of the container 230. In this case, the waste toner T1 does not act as resistance of the flexible sheet 212, and thus, the flexible sheet 212 is less bent and can be brought closer to the magnetic sensor 214. FIG. 15B illustrates a state in which the cartridge 200 has been used for a long time, and the waste toner portion 240 is nearly full of the waste toner T1. The flexible sheet 212 is formed of a sheet member as thin as possible (in the present embodiment, a PET or PPS sheet having a thickness of 50 μm). Therefore, as illustrated in FIG. 15B, the waste toner T1 acts as resistance, and the flexible sheet 212 rotates while being bent when the stirring shaft 211 rotates in the F direction. Therefore, the magnet 213 and the magnetic sensor 214 are distanced from each other, and a relationship of L4>L3 is obtained.

As described above, the behavior of the magnet 213 changes in accordance with the amount of the waste toner T1 in the waste toner unit 240 of the container 230, and consequently, the detection time for which the magnetic sensor 214 detects the magnetism generated by the magnet 213 changes. That is, as the amount of waste toner decreases, the magnet 213 can be brought closer to the magnetic sensor 214, and therefore, as the amount of waste toner decreases, the detection time increases.

Figure 16:
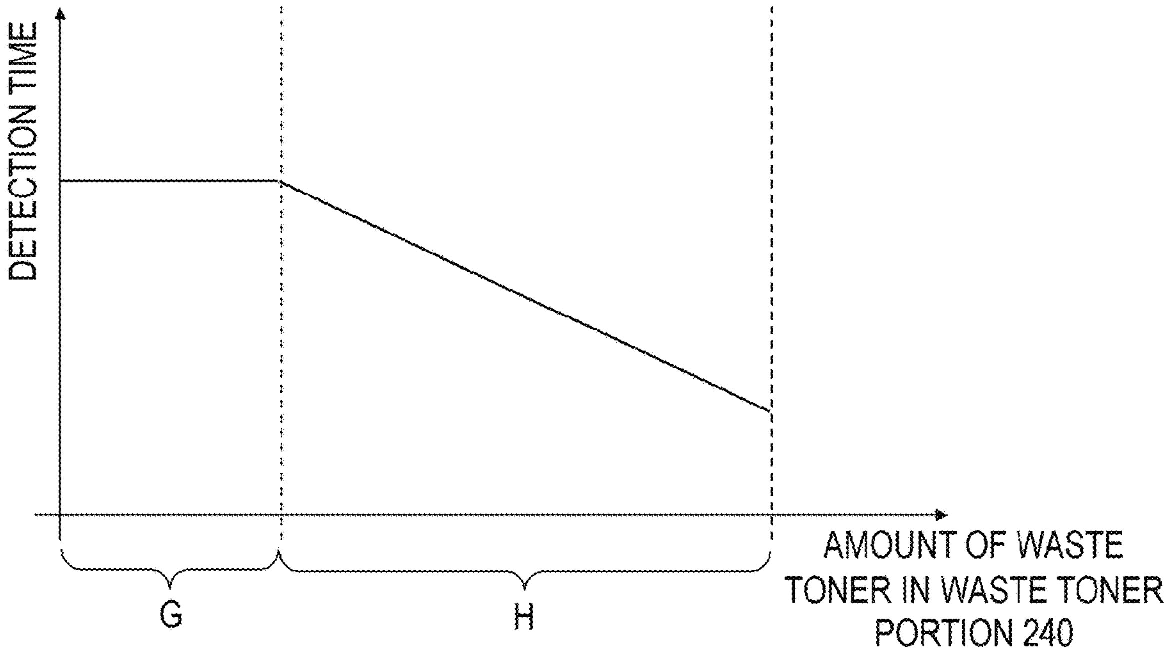
FIG. 16 is an explanatory diagram illustrating a relationship between detection time and the amount of waste toner according to Embodiment 2

FIG. 16 specifically illustrates the relationship between the amount of waste toner in the waste toner portion 240 of the container 230 and the detection time of the magnetic sensor 214. In the graph of FIG. 16, the horizontal axis represents the amount of waste toner in the waste toner portion 240, and the vertical axis represents the detection time. The waste toner T1 in the waste toner portion 240 of the container 230 increases as the cartridge 200 is used, and therefore, the amount of waste toner actually transitions from the left to the right side of the paper in FIG. 16.

As illustrated in FIG. 16, although the waste toner cannot be detected when the amount of the waste toner is small (portion G), once the amount of the waste toner has increased (portion H), the detection time and the amount of the waste toner have a proportional relationship so that the amount of the waste toner can be estimated.

By detecting the amount of waste toner in the waste toner unit with the above-described configuration, the user can be notified before the waste toner unit becomes full so that a product with good usability can be provided. Further, the amount of waste toner can be detected in a space-saving manner, and can be stably detected even by a compact color low-end product. As in Embodiment 1, in the present embodiment, too, the process cartridge in the cartridge system has been described as an example. However, the process cartridge may have a configuration in which the developing device is fixed to the image forming apparatus.

The configuration of each embodiment described above can be combined with the configurations of the others.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-027478, filed on Feb. 27, 2024, which is hereby incorporated by reference herein in its entirety.

What is claimed is:

1. An image forming apparatus comprising:

an apparatus main body;

a first cartridge that is detachably attachable to the apparatus main body, the first cartridge including a storage chamber that stores developer, a rotational shaft that is provided in the storage chamber so as to be rotatable about a rotational axis line, a flexible member that has one end and an other end in a direction crossing the rotational axis line, the one end being a free end and the other end being a fixed end fixed to the rotational shaft, and a magnetism generating member that is fixed between the fixed end exclusive and the free end inclusive of the flexible member; and a second cartridge that is detachably attachable to the apparatus main body, the second cartridge including a sensor for detecting magnetism generated by the magnetism generating member.

2. The image forming apparatus according to claim 1, wherein the first cartridge and the second cartridge are aligned in a first direction, and wherein the sensor is provided between the first cartridge and the second cartridge in the first direction.

3. The image forming apparatus according to claim 2, wherein the first cartridge includes a first frame that constitutes the storage chamber, and a developing roller configured to bear developer in the storage chamber, wherein the second cartridge includes a photosensitive drum and a second frame that rotatably supports the photosensitive drum, and wherein the sensor is supported by the second frame such that the sensor faces the first frame in the first direction.

4. The image forming apparatus according to claim 3, wherein, assuming that the photosensitive drum, the storage chamber, and the developing roller are referred to as a second photosensitive drum, a first storage chamber, and a first developing roller, respectively, the first cartridge includes a first photosensitive drum configured to receive developer supplied from the first developing roller, and the second cartridge includes a second storage chamber that stores developer and a second developing roller configured to bear developer in the second storage chamber and supply developer to the second photosensitive drum.

5. The image forming apparatus according to claim 2, wherein the first cartridge includes a photosensitive drum, a cleaning member that removes developer from the photosensitive drum, and a first frame that rotatably supports the photosensitive drum and supports the cleaning member, wherein the storage chamber is a storage chamber that is constituted by the first frame and that stores developer removed from the photosensitive drum by the cleaning member, wherein the second cartridge includes a developing roller configured to bear developer and a second frame that rotatably supports the developing roller, and wherein the sensor is supported by the second frame such that the sensor faces the first frame in the first direction.

6. The image forming apparatus according to claim 3, wherein the second cartridge includes:

a holder that holds the sensor and that is movable with respect to the second frame; and a biasing member that applies a biasing force to the holder, the biasing force biasing the holder toward the first frame.

7. The image forming apparatus according to claim 5, wherein, assuming that the photosensitive drum, the storage chamber, and the developing roller are referred to as a first photosensitive drum, a first storage chamber, and a second developing roller, respectively, the first cartridge includes a first developing roller configured to carry developer and supply developer to the first photosensitive drum, and the second cartridge includes a second photosensitive drum configured to receive developer supplied from the second developing roller.

8. The image forming apparatus according to claim 2, wherein the sensor is provided so as to be aligned with the storage chamber in the first direction.

9. The image forming apparatus according to claim 1, wherein the sensor is disposed at a position where time for detecting the magnetism during rotation of the rotational shaft increases as toner stored in the storage chamber decreases.

10. The image forming apparatus according to claim 1, wherein, in a case of being viewed in the horizontal direction, the sensor is provided at a height that is higher than a bottom surface of the storage chamber and that overlaps the rotational shaft.

11. The image forming apparatus according to claim 1, wherein, assuming that the storage chamber is referred to as a first storage chamber, the rotational shaft is referred to as a first rotational axis line, the rotational axis line is referred to as a first rotational shaft, the flexible member is referred to as a first flexible member, and the magnetism generating member is referred to as a first magnetism generating member, the second cartridge includes:

a second storage chamber that stores developer;

a second rotational shaft that is provided in the second storage chamber so as to be rotatable about a second rotational axis line;

a second flexible member that has one end and an other end in a direction crossing the second rotational axis line, the one end being a free end and the other end being a fixed end fixed to the second rotational shaft; and a second magnetism generating member that is fixed between the fixed end and the free end of the second flexible member, and wherein the sensor is disposed at a position where the sensor does not detect magnetism generated by the second magnetism generating member.

12. The image forming apparatus according to claim 11, wherein the first cartridge includes a first frame including the first storage chamber, wherein the second cartridge includes a second frame including the second storage chamber, and wherein, in an alignment direction of the first cartridge and the second cartridge, the sensor is provided in the second frame on a side close to the first frame, and the second storage chamber is provided in the second frame on a side away from the first frame.

13. The image forming apparatus according to claim 12, wherein the second cartridge includes a photosensitive drum and a charging roller for charging the photosensitive drum, wherein, in the alignment direction, the photosensitive drum and the charging roller are provided in the second frame on a side close to the first frame, and the sensor is provided at a position higher than the charging roller and closer to the first frame than the photosensitive drum and the charging roller.

14. The image forming apparatus according to claim 12, wherein the second cartridge includes a photosensitive drum, a developing roller that bears developer for developing an electrostatic latent image formed on the photosensitive drum, a third storage chamber that stores developer to be supplied to the developing roller, and a cleaning member for removing developer from the photosensitive drum, wherein the second storage chamber is a storage chamber that stores developer removed from the photosensitive drum by the cleaning member, and wherein, in the alignment direction, the third storage chamber and the developing roller are provided in the second frame on a side close to the first frame and the sensor is provided at a position closer to the first frame than the third storage chamber and the developing roller.

15. The image forming apparatus according to claim 11, wherein the first cartridge includes:

a first drum unit that includes a first photosensitive drum; and a first developing unit that includes a first developing roller which bears developer for developing an electrostatic latent image formed on the first photosensitive drum, the first storage chamber which stores developer to be supplied to the first developing roller, the first rotational shaft, the first flexible member, and the first magnetism generating member, wherein the second cartridge includes:

a second drum unit that includes a second photosensitive drum; and a second developing unit that includes a second developing roller which bears developer for developing an electrostatic latent image formed on the second photosensitive drum, the second storage chamber which stores developer to be supplied to the second developing roller, the second rotational shaft, the second flexible member, and the second magnetism generating member, wherein the first drum unit, the first developing unit, the second drum unit, and the second developing unit are aligned in this order, and wherein the sensor is provided in the second drum unit.

16. The image forming apparatus according to claim 15, wherein the second developing unit is configured to be movable with respect to the second drum unit such that the second developing roller can take a contact position and a separate position with respect to the second photosensitive drum.

17. The image forming apparatus according to claim 11, wherein the first cartridge includes:

a first drum unit that includes a first photosensitive drum, a first cleaning member for removing developer from the first photosensitive drum, the first storage chamber which stores developer removed from the first photosensitive drum by the first cleaning member, the first rotational shaft, the first flexible member, and the first magnetism generating member; and a first developing unit that includes a first developing roller which bears developer for developing an electrostatic latent image formed on the first photosensitive drum, wherein the second cartridge includes:

a second drum unit that includes a second photosensitive drum, a second cleaning member for removing developer from the second photosensitive drum, the second storage chamber which stores developer removed from the second photosensitive drum by the second cleaning member, the second rotational shaft, the second flexible member, and the second magnetism generating member; and a second developing unit that includes a second developing roller which bears developer for developing an electrostatic latent image formed on the second photosensitive drum, wherein the first developing unit, the first drum unit, the second developing unit, and the second drum unit are aligned in this order, and wherein the sensor is provided in the second developing unit.

18. The image forming apparatus according to claim 11, further comprising a third cartridge that is detachably attachable to the apparatus main body, wherein the third cartridge is attached to the apparatus main body so as to be adjacent to the second cartridge on a side opposite to the first cartridge, and wherein, assuming that the sensor is referred to as a second sensor, the third cartridge includes a third sensor for detecting magnetism generated by the second magnetism generating member.

19. The image forming apparatus according to claim 11, wherein the apparatus main body includes a tray that supports the first cartridge and the second cartridge, and wherein, assuming that the sensor is referred to as a second sensor, the tray includes a fourth sensor for detecting magnetism generated by the second magnetism generating member.

20. A cartridge comprising:
a storage chamber that stores developer;
a rotational shaft that is provided in the storage chamber so as to be rotatable about a rotational axis line;
a flexible member that has one end and an other end in a direction crossing the rotational axis line, the one end being a free end and the other end being a fixed end fixed to the rotational shaft; and
a magnetism generating member that is fixed between the fixed end exclusive and the free end inclusive of the flexible member,
wherein the cartridge is one of a plurality of cartridges detachably attachable to an apparatus main body of an image forming apparatus, and
wherein the cartridge includes a sensor for detecting magnetism generated by an other magnetism generating member included in an other cartridge among the plurality of cartridges attached to the apparatus main body.

21. The cartridge according to claim 20,
wherein the sensor does not detect magnetism generated by the magnetism generating member included in the cartridge.

22. The cartridge according to claim 20,
wherein the cartridge is aligned with the other cartridge in a first direction, and
wherein the sensor is provided between the cartridge and the other cartridge in the first direction.

23. The cartridge according to claim 22,
the cartridge comprising:
a photosensitive drum; and
a frame that rotatably supports the photosensitive drum,
wherein the sensor is supported by the frame such that the sensor faces an other frame included in the other cartridge in the first direction.

24. The cartridge according to claim 23,
the cartridge comprising:
a holder that holds the sensor and that is movable with respect to the frame; and
a biasing member that applies a biasing force to the holder, the biasing force biasing the holder toward the other frame.

25. The cartridge according to claim 20,
wherein the sensor is disposed at a position where time for detecting magnetism generated by the other magnetism generating member during rotation of an other rotational shaft included in the other cartridge increases as toner stored in an other storage chamber included in the other cartridge decreases.

26. The cartridge according to claim 20,
wherein, in a case of being viewed in the horizontal direction, the sensor is provided at a height that is higher than a bottom surface of an other storage chamber included in the other cartridge and that overlaps an other rotational shaft included in the other cartridge.

27. The cartridge according to claim 20,
the cartridge comprising:
a drum unit that includes a photosensitive drum; and
a developing unit that includes a developing roller which bears developer for developing an electrostatic latent image formed on the photosensitive drum, the storage chamber which stores developer to be supplied to the developing roller, the rotational shaft, the flexible member, and the magnetism generating member;
wherein the sensor is provided in the drum unit.

28. The cartridge according to claim 27,
wherein the drum unit includes a charging roller for charging the photosensitive drum, and
wherein the sensor is provided at a position higher than the charging roller and closer to the other cartridge than the photosensitive drum and the charging roller.

29. The cartridge according to claim 20,
the cartridge comprising:
a drum unit that includes a photosensitive drum, a cleaning member for removing developer from the photosensitive drum, the storage chamber which stores developer removed from the photosensitive drum by the cleaning member, the rotational shaft, the flexible member, and the magnetism generating member; and
a developing unit that includes a developing roller which bears developer for developing an electrostatic latent image formed on the photosensitive drum,
wherein the sensor is provided in the developing unit.

30. The cartridge according to claim 29,
wherein the developing unit includes a second storage chamber that stores developer to be supplied to the developing roller, and
wherein the sensor is provided at a position closer to the other cartridge than the second storage chamber and the developing roller.

31. The cartridge according to claim 20,
wherein magnetism generated by the magnetism generating member is detected by another sensor included in still another cartridge attached to the apparatus main body.

32. The cartridge according to claim 20,
wherein the cartridge is supported by a tray included in the apparatus main body, and
wherein magnetism generated by the magnetism generating member is detected by an other sensor provided in the tray.

* * * * *